(12) United States Patent
Liu et al.

(10) Patent No.: US 8,959,343 B2
(45) Date of Patent: *Feb. 17, 2015

(54) AUTHENTICATION SYSTEM, METHOD AND DEVICE

(75) Inventors: Lijun Liu, Beijing (CN); Bo Yang, Beijing (CN); Xiaoming Lu, Beijing (CN); Huaxi Peng, Beijing (CN); Jing Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 295 days.

This patent is subject to a terminal disclaimer.

(21) Appl. No.: 13/512,309

(22) PCT Filed: Nov. 26, 2010

(86) PCT No.: PCT/CN2010/001907
§ 371 (c)(1),
(2), (4) Date: May 25, 2012

(87) PCT Pub. No.: WO2011/063612
PCT Pub. Date: Jun. 3, 2011

(65) Prior Publication Data
US 2012/0265990 A1    Oct. 18, 2012

(30) Foreign Application Priority Data

Nov. 26, 2009  (CN) .......................... 2009 1 0238579
Dec. 24, 2009  (CN) .......................... 2009 1 0243503

(51) Int. Cl.
*H04L 9/32*      (2006.01)
*H04W 12/06*   (2009.01)
*H04L 29/06*    (2006.01)

(52) U.S. Cl.
CPC ........... *H04W 12/06* (2013.01); *H04L 65/1016* (2013.01); *H04L 65/1063* (2013.01)
USPC ............... 713/168; 713/151; 713/155; 726/3; 726/4; 726/9; 709/227; 709/230

(58) Field of Classification Search
CPC  H04W 12/06; H04L 65/1016; H04L 65/1063
USPC ....................... 713/151, 155, 168; 726/3, 4, 9; 709/227, 230; 380/278, 282
See application file for complete search history.

(56) References Cited

U.S. PATENT DOCUMENTS

2007/0074275 A1* 3/2007 Bajko et al. ..................... 726/4
2008/0120425 A1* 5/2008 Beyer et al. ................. 709/230

(Continued)

FOREIGN PATENT DOCUMENTS

CN        1870822       11/2006
CN      101127603       2/2008

(Continued)

OTHER PUBLICATIONS

3GPP2 S.S0109-0, "Generic Boostrapping Architecture Framework", version 1.0, Mar. 30, 2006 hereinafter 3GPP2.*
PCT/CN2010/001907, Mar. 10, 2011, International Search Report.

*Primary Examiner* — Kambiz Zand
*Assistant Examiner* — Noura Zoubair
(74) *Attorney, Agent, or Firm* — Workman Nydegger

(57) ABSTRACT

An authentication system, method and device are provided in the present application. The authentication system includes an Application Server (AS) for providing non Internet protocol Multimedia Subsystem (IMS) service, an authentication gateway and an IMS terminal. The AS forwards a connection request message sent by the IMS terminal to said authentication gateway, the authentication gateway sends a obtained first random number to said IMS terminal through the AS, the IMS terminal generates a first Response (RES) value according to the first random number and sends the generated first RES value to the authentication gateway through the AS, and if the received first response value and an obtained Expected Response (XRES) value is found coincident after being compared by the authentication gateway, the authentication gateway determines that the authentication to the IMS terminal is passed, and indicates the AS to provide non IMS service for the IMS terminal. By using the technical solutions of the present application, solved is the problem existed in prior art that non IMS AS needs to authenticate each of IMS terminals respectively for obtaining non IMS service and thus reducing the service processing efficiency of the AS.

30 Claims, 13 Drawing Sheets

(56) References Cited

U.S. PATENT DOCUMENTS

2008/0273704 A1* 11/2008 Norrman et al. .............. 380/278
2008/0304495 A1   12/2008 Jackson et al.

FOREIGN PATENT DOCUMENTS

| CN | 101197673 | 6/2008 |
| CN | 101577910 | 11/2009 |

* cited by examiner

--Prior Art--

--Prior Art--

--Prior Art--

AUTHENTICATION SYSTEM, METHOD AND DEVICE

The present application is a US National Stage of International Application No. PCT/CN2010/001907, filed 26 Nov. 2010, designating the United States, and claiming priorities to Chinese Patent Application No. 200910238579.4 filed 26 Nov. 2009 and Chinese Patent Application No. 200910243503.0.

FIELD OF THE INVENTION

The present invention relates to the field of communications and particularly to an authentication system, method and device.

BACKGROUND OF THE INVENTION

An Internet Protocol Multimedia Subsystem (IMS) is a Session Initiation Protocol (SIP) based session control system resulting from an extension of Packet Switching (PS) domain network, and the IMS system is constituted of a Call Session Control Function (CSCF), a Media Gateway Control Function (MGCF), a Multimedia Resource Function Controller (MRFC), a Home Subscriber Server (HSS), a Breakout Gateway Control Function (BGCF), a Multimedia Resource Function Processor (MRFP), a Media Gateway (MGW), an Application Server (AS) providing an IMS service and other functional entities. The CSCF can logically functionally divided into three logic entities of a Serving-CSCF (S-CSCF), a Proxy-CSCF (P-CSCF) and an Interrogating-CSCF (I-CSCF), where the S-CSCF is a service switching center of the IMS system to perform session control, maintain a session status, manage information of an IMS user equipment, generate billing information, etc., the P-CSCF is an initial access point of the IMS user equipment to the IMS system to perform registration of the IMS user equipment, Quality of Service (QoS) control and security management, communication with a General Packet Radio Service (GPRS) system, etc., and the I-CSCF enables communication with the IMS system, manages allocation and selection of the S-CSCF, hides a network topology and configuration from the outside, generates billing data, etc.; the BGCF provides controlled communication with another IMS system; the MGCF and the MGW enable intercommunication between the IMS system and a Circuit Switching (CS) domain system and between the IMS system and a Public Switched Telephone Network (PSTN); the MRFC provides a media resource; and the HSS stores subscription data and configuration of the IMS user equipment, authentication data of the IMS user equipment, etc.

FIG. 1 is a schematic structural diagram of an IMS system in the prior art, where an IMS user equipment accesses a P-CSCF of the IMS system to be registered with the IMS system, and subsequently an AS providing an IMS service provides the IMS user equipment with the EMS service, and the IMS user equipment can further be connected with an AS providing a non-IMS service via an interface Ut to access the non-IMS service. An AS providing an IMS service is referred to as an "IMS AS", and an AS providing a non-IMS service is referred to as a "non-IMS AS". An access to an IMS service and an access to a non-IMS service will be introduced below in details respectively.

Reference is made to FIG. 2 illustrating a flow chart of a method for an IMS user equipment to access an IMS service in the prior art, and a specific process flow thereof is as follows.

In the step 21, an IMS user equipment initiates an IMS registration and authentication flow to a P-CSCF/S-CSCF in an IMS system.

In the step 22, the P-CSCF/S-CSCF in the EMS system registers a login status of the EMS user equipment with the HSS, and subscription data and configuration information of the IMS user equipment are stored in the HSS.

In the step 23, the IMS user equipment transmits an SIP service request carrying the identify of a user of the IMS user equipment to the P-CSCF/S-CSCF, where the identity of the user of the IMS user equipment is carried in "P-Preferred-Identity" of a header of the SIP service request.

In the step 24, the P-CSCF judges whether the IMS user equipment has been registered upon reception of the SIP service request, and if so, the P-CSCF replaces "P-Preferred-Identity" of the header of the SIP service request with "P-Asserted-Identity", including the identity of the authenticated user, to indicate that the identity of the IMS user equipment has been authenticated successfully, and since the identity of the user of the IMS user equipment has been stored in the P-CSCF when the IMS user equipment is registered, the P-CSCF can perform identity authentication directly on the IMS user equipment.

In the step 25, the P-CSCF forwards the modified SIP service request to an IMS AS through the S-CSCF.

In the step 26, the IMS AS determines whether the received modified SIP service request carries "P-Asserted-Identity" upon reception of the SIP service request, and if so, the IMS AS has authenticated the identity of the EMS user equipment.

In the step 27, the IMS AS responds to the P-CSCF/S-CSCF with the authentication result of successful authentication.

In the step 28, the P-CSCF/S-CSCF responds to the SIP service request of the IMS user equipment by indicating that the identity of the IMS user equipment has been authenticated successfully and the IMS user equipment can perform service interaction with the IMS AS.

In the step 29, the IMS user equipment performs service interaction directly with the IMS AS to access an IMS service provided by the IMS AS.

When no P-CSCF exists in the IMS system, the flow can proceed directly through an S-CSCF functioning as both a P-CSCF and an S-CSCF, or if a P-CSCF is present, the flow proceeds through the interaction between a P-CSCF and an S-CSCF currently serving the IMS user equipment.

As can be apparent from the foregoing process flow, the P-CSCF in the IMS system instead of the IMS AS performs identity authentication on the IMS user equipment accessing the IMS service without separate identity authentication of the IMS AS on the IMS user equipment.

Reference is made to FIG. 3 illustrating a flow chart of a method for an IMS user equipment to access a non-IMS service in the prior art, and a specific process flow is as follows.

In the step 31, an IMS user equipment initiates a Hypertext Transfer Protocol (HTTP) request to a non-IMS AS.

In the step 32, the non-IMS AS responds with a No-Grant message carrying a first random number generated randomly by the non-IMS AS and a realm of the IMS user equipment, where the realm instructs the IMS user equipment to use a username and a password for authentication.

In the step 33, the IMS user equipment detects that the message carries the realm upon reception of the message and calculates a first response value from its own username and password and the received first random number in a preset algorithm.

In the step 34, the IMS user equipment carries the calculated first response value and a second random number generated randomly by the IMS user equipment in an HTTP response message and transmits the HTTP response message to the non-IMS AS;

In the step 35, the non-IMS AS generates a second response value from its own generated first random number and the username and the password of the IMS user equipment in a preset algorithm upon reception of the HTTP response message.

In the step 36, the non-IMS AS determines whether the calculated second response value is consistent with the received first response value, and if so, the non-IMS AS has identity authentication done on the IMS user equipment.

In the step 37, the non-IMS AS calculates a third response value from the second random number generated randomly by the IMS user equipment and the username and the password of the IMS user equipment, carried in the received HTTP response message, in a preset algorithm.

In the step 38, the non-IMS AS carries the calculated third response value in a 200OK message and transmits the 200OK message to the IMS user equipment to have the IMS user equipment authenticate the non-IMS AS.

In the step 39, the IMS user equipment calculates a fourth response value from its own generated second random number and the username and the password of the IMS user equipment in a preset algorithm upon reception of the 200OK message.

In the step 310, the IMS user equipment determines whether the calculated fourth response value is consistent with the received third response value, and if so, the IMS user equipment has authenticated the non-IMS AS.

In the step 311, the IMS user equipment transmits an HTTP service request to the non-IMS AS.

In the step 312, the non-IMS AS responds to the IMS user equipment with a 200OK message and establishes a service connection with the IMS user equipment, and the IMS user equipment accesses a non-IMS service provided by the non-IMS AS.

As can be apparent from the foregoing process flow, authentication has to be performed directly between the non-IMS AS and the IMS user equipment accessing the non-IMS service because the non-IMS AS can not acquire authentication data of the IMS user equipment from the IMS system; and there is no uniform standard for authentication modes between different non-IMS ASs and the IMS user equipment, and available authentication mechanisms can include a username/password authentication mechanism, an HTTP digest mechanism, and a transport layer security mechanism with a pre-shared keyword.

In the prior art, the non-IMS AS has to authenticate each IMS user equipment accessing a non-IMS service, thus degrading the service processing efficiency of the AS.

SUMMARY OF THE INVENTION

Embodiments of the invention provide an authentication system and method so as to address such a problem in the prior art that a non-IMS AS has to authenticate each IMS user equipment accessing a non-IMS service, thus degrading the service processing efficiency of the AS.

Correspondingly, embodiments of the invention further provide an authentication gateway, an application server and an IMS user equipment.

Technical solutions of the embodiments of the invention are as follows.

An authentication system includes an Application Server (AS) providing a non-Internet Protocol Multimedia Subsystem (IMS) service, an authentication gateway and an IMS user equipment, wherein the AS is configured to forward a connection request message transmitted from the IMS user equipment to the authentication gateway and a first random number transmitted from the authentication gateway to the IMS user equipment, to transmit a first response value, generated from the first random number, fed back from the IMS user equipment to the authentication gateway and to provide the IMS user equipment with the non-IMS service in response to an instruction of the authentication gateway; the authentication gateway is configured to acquire the first random number and an expected response value of the IMS user equipment, to transmit the acquired first random number to the AS, to ascertain that the IMS user equipment has been authenticated successfully when comparison of the first response value transmitted from the AS with the acquired expected response value shows consistency and to instruct the AS to provide the IMS user equipment with the non-IMS service; and the IMS user equipment is configured to transmit the connection request message to the AS, to generate the first response value from the first random number transmitted from the AS and to transmit the generated first response value to the AS.

An authentication method includes the steps of: receiving, by an authentication gateway, a connection request message transmitted through an Application Server (AS) providing a non-Internet Protocol Multimedia Subsystem (IMS) service, from an IMS user equipment; acquiring a first random number and an expected response value of the IMS user equipment; transmitting, by the authenticating gateway, the acquired first random number to the IMS user equipment through the AS; receiving a first response value transmitted through the AS from the IMS user equipment, wherein the first response value is generated by the IMS user equipment from the first random number; ascertaining, by the authenticating gateway, that the IMS user equipment has been authenticated successfully when comparison of the received first response value with the acquired expected response value shows consistency; and instructing the AS to provide the IMS user equipment with the non-IMS service.

An authentication gateway includes: a first receiving unit configured to receive a connection request message transmitted through an Application Server (AS) providing a non-Internet Protocol Multimedia Subsystem (IMS) service from an IMS user equipment; an acquiring unit configured to acquire a first random number and an expected response value of the IMS user equipment; a first transmitting unit configured to transmit the first random number acquired by the acquiring unit to the IMS user equipment through the AS; a second receiving unit configured to receive a first response value transmitted through the AS from the IMS user equipment, wherein the first response value is generated by the IMS user equipment from the first random number; a comparing unit configured to compare the first response value received by the second receiving unit with the expected response value acquired by the acquiring unit for consistency; an ascertaining unit configured to ascertain that the IMS user equipment has been authenticated successfully when the result of comparison by the comparison unit shows consistency; and an instructing unit configured to instruct the AS to provide the IMS user equipment with the non-IMS service.

An application server providing a non-Internet Protocol Multimedia Subsystem (IMS) service includes: a first receiving unit configured to receive a connection request message transmitted from an IMS user equipment; a first forwarding unit configured to forward the connection request message received by the first receiving unit to an authentication gateway; a second receiving unit configured to receive a first random number transmitted from the authentication gateway; a second forwarding unit configured to forward the first random number received by the second receiving unit to the IMS user equipment; a third receiving unit configured to receive a first response value transmitted from the IMS user equipment; a third forwarding unit configured to forward the first response value received by the third receiving unit to the authentication gateway; and a providing unit configured to provide the IMS user equipment with the non-IMS service in response to an instruction of the authentication gateway.

An Internet Protocol Multimedia Subsystem user equipment includes: a first transmitting unit configured to transmit a connection request message to an Application Server (AS) providing a non-Internet Protocol Multimedia Subsystem, IMS, service; a first receiving unit configured to receive a first random number transmitted through the AS from an authentication gateway; a first generating unit configured to generate a first response value from the first random number received by the first receiving unit; a second transmitting unit configured to transmit the first response value generated by the first generating unit to the AS; and a service accessing unit configured to access the non-IMS service from the AS.

In the technical solutions according to the embodiments of the invention, an authentication system includes an AS providing a non-IMS service, an authentication gateway and an IMS user equipment, where the AS forwards a connection request message transmitted from the IMS user equipment to the authentication gateway, the authentication gateway transmits an acquired first random number to the IMS user equipment through the AS, the IMS user equipment generates a first response value from the first random number and transmits the generated first response value to the authentication gateway through the AS, and when comparison of the received first response value with an acquired expected response value shows consistency, the authentication gateway ascertains that the IMS user equipment has been authenticated successfully and instructs the AS to provide the IMS user equipment with the non-IMS service. As can be apparent in the authentication system according to the invention, the IMS user equipment is authenticated by the authentication gateway, thereby improving effectively the service processing efficiency of the AS and enabling the AS providing the non-IMS service to authenticate the IMS user equipment simply and uniformly without requiring the IMS user equipment to negotiate with each AS providing a non-IMS service about an authentication mechanism, thus making authentication easy to perform.

DETAILED DESCRIPTION OF THE EMBODIMENTS

A general implementation principle and specific implementations of the technical solutions according to the embodiments of the invention and advantageous effects that they can attain correspondingly will be set forth in details below with reference to the drawings.

Figure 1:
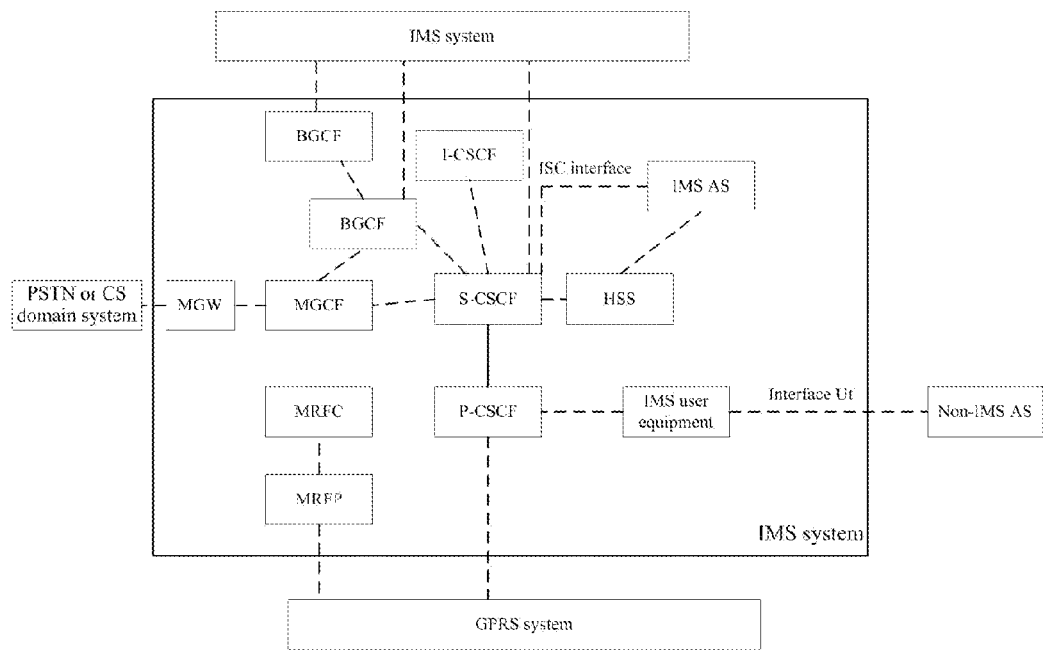
FIG. 1 is a schematic structural diagram of an IMS system in the prior art.
Figure 2:
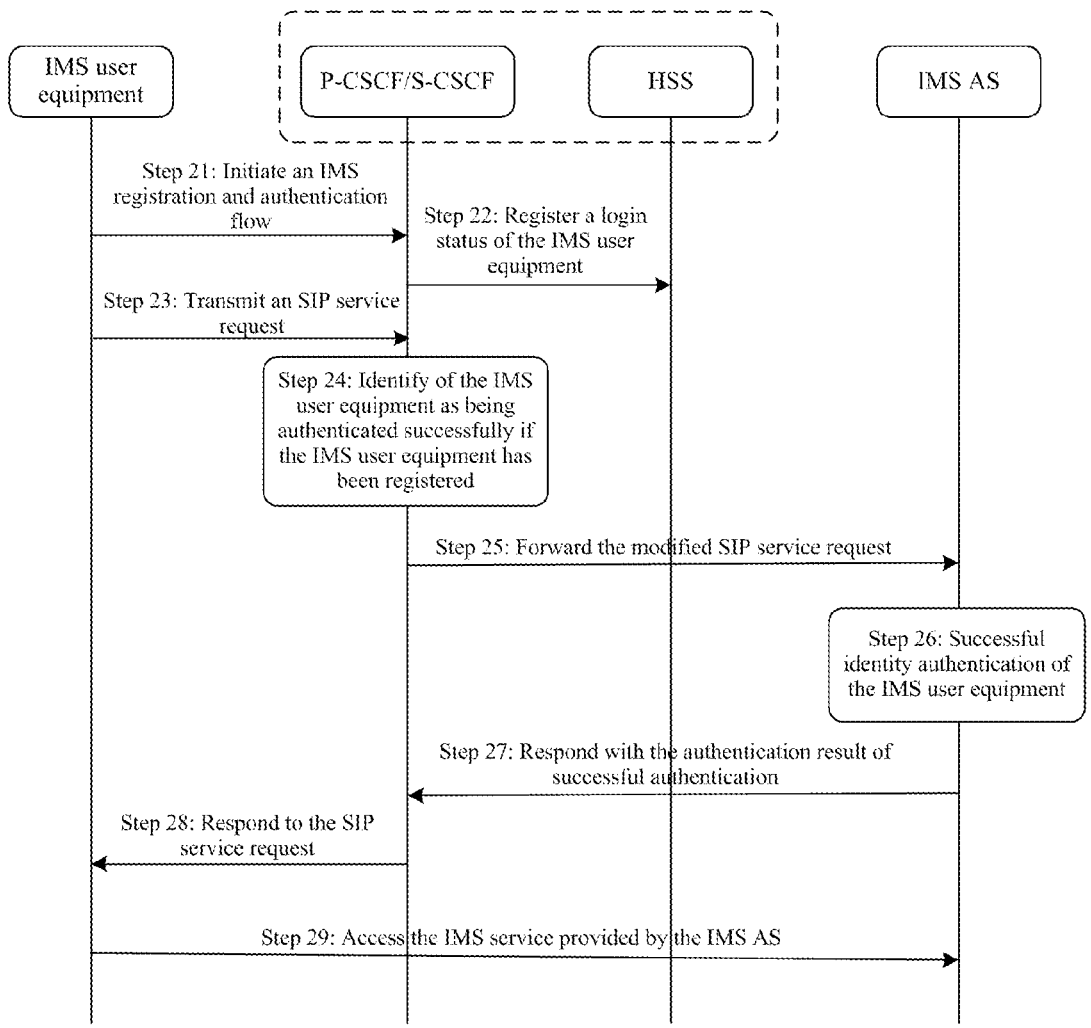
FIG. 2 is a schematic flow chart of a method for an IMS user equipment to access an IMS service in the prior art.
Figure 3:
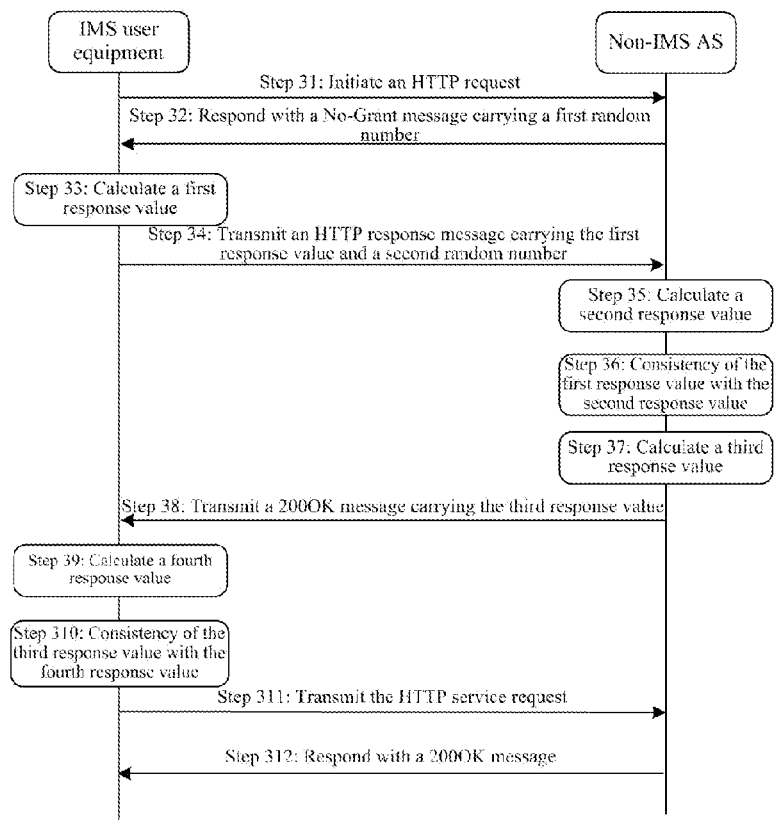
FIG. 3 is a schematic flow chart of a method for an IMS user equipment to access a non-IMS service in the prior art.

In the prior art, an IMS user equipment accessing a non-IMS service has to establish a connection with an AS of the non-IMS service (a non-IMS AS), and the non-IMS AS has to authenticate the IMS user equipment prior to establishment of the connection; and since the IMS user equipment interacts directly with the non-IMS AS via an interface Ut without going through a core network of an IMS system, the IMS user equipment can not be authenticated by the core network of the IMS system instead of by the non-IMS AS as illustrated in the process of FIG. 2. If authentication is performed directly between the IMS user equipment and the non-IMS AS, the service processing efficiency of the AS may be degraded, and authentication has to be performed after an authentication mechanism is negotiated about in advance between them; the IMS user equipment has to be authenticated with different non-IMS ASs to access different non-IMS services provided by the different non-IMS ASs and thus has to be authenticated after negotiating about an authentication mechanism in advance with each of the different non-IMS ASs; and the different non-IMS ASs have to store authentication data of the IMS user equipment being authenticated, thus degrading the reliability and security of authentication possibly due to leakage of the authentication data of the IMS user equipment.

Figure 4:
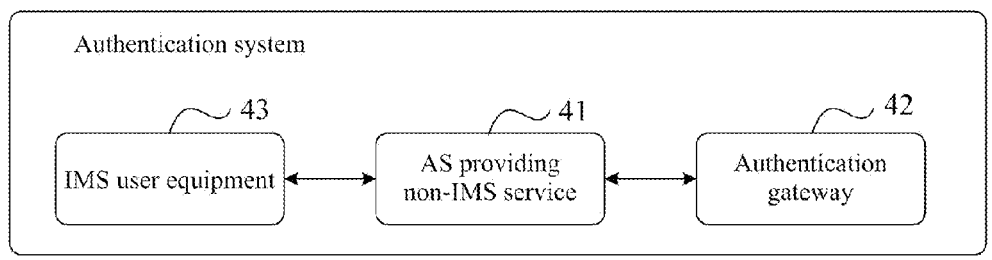
FIG. 4 is a schematic structural diagram of an authentication system according to an embodiment of the invention.

In view of the foregoing problems, an embodiment of the invention provides an authentication system structured as in FIG. 4, which includes an AS 41 providing a non-IMS service, an authentication gateway 42 and an IMS user equipment 43.

The AS 41 is configured to forward a connection request message transmitted from the IMS user equipment 43 to the authentication gateway 42 and a first random number (RAND) transmitted from the authentication gateway 42 to the IMS user equipment 43, to transmit a first response value (RES, ResponseInternet Explorer), generated from the first RAND, fed back from the IMS user equipment 43 to the authentication gateway 42 and to provide the IMS user equipment 43 with the non-IMS service in response to an instruction of the authentication gateway 42.

The authentication gateway 42 is configured to acquire the first RAND and an expected response value (XRES, Expected ResponseInternet Explorer) of the IMS user equipment 43, to transmit the acquired first RAND to the AS 41, to ascertain that the IMS user equipment 43 has been authenticated successfully when comparison of the first RES transmitted from the AS 41 with the acquired XRES shows consistency and to instruct the AS 41 to provide the IMS user equipment 43 with the non-IMS service.

The IMS user equipment 43 is configured to transmit the connection request message to the AS 41, to generate the first RES from the first RAND transmitted from the AS 41 and to transmit the generated first RES to the AS 41.

In an embodiment of the invention, the connection request message transmitted from the IMS user equipment can include but will not be limited to an HTTP message.

A specific implementation flow in which the authentication gateway acquires the first RAND and the expected RES can include but will not be limited to the following two implementation scenarios.

In a first implementation scenario, the authentication gateway acquires authentication parameters of the IMS user equipment, including the first RAND and the XRES of the IMS user equipment, where the authentication gateway can acquire the authentication parameters from an HSS (but not limited thereto), then the connection request message received by the authentication gateway carries an IMS Public User Identity (IMPU) of the IMS user equipment, the authentication gateway transmits a retrieval request carrying the IMPU to the HSS, and the HSS searches, by the received IMPU, stored correspondence relationships between IMPUs and authentication parameters for the authentication parameters corresponding to the received IMPU and transmits the retrieved authentication parameters to the authentication gateway.

In a second implementation scenario, the authentication gateway generates the first RAND and acquires authentication data of the IMS user equipment and then generates the XRES from the generated first RAND and the acquired authentication data, where the authentication gateway can acquire the authentication data from an HSS (but not limited thereto), then the connection request message received by the authentication gateway carries an IMPU of the IMS user equipment, the authentication gateway transmits a retrieval request carrying the IMPU to the HSS, and the HSS searches, by the received IMPU, stored correspondence relationships between IMPUs and authentication data for the authentication data corresponding to the received IMPU and transmits the retrieved authentication data to the authentication gateway.

The authentication gateway has an interface with the HSS, which can include but will not be limited to an interface Sh, possibly in the protocol of DIAMETER, and an interface with the AS in a non-SIP protocol, e.g., the protocol of HTTP, or they can be connected instead over the Internet.

The foregoing process relates to unidirectional authentication on the IMS user equipment, and of course, bidirectional authentication can be performed, that is, the IMS user equipment also authenticates the AS, which will be introduced below.

In the first implementation scenario, the authentication parameters acquired by the authentication gateway further include a first Authentication Token (AUTN);

the authentication gateway is further configured to transmit the acquired first AUTN to the AS before receiving the first RES transmitted through the AS from the IMS user equipment;

the AS is further configured to transmit the first AUTN transmitted from the authentication gateway to the IMS user equipment; and the IMS user equipment is further configured to generate a second AUTN from the first RAND before generating the first RES and to ascertain that the AS has been authenticated successfully when comparison of the generated second AUTN with the received first AUTN shows consistency.

In the second implementation scenario, the IMS user equipment is further configured to generate a second RAND, to transmit the generated second RAND to the AS, to receive a second RES transmitted from the AS, to generate a third RES from the second RAND and its own authentication data and to ascertain that the AS has been authenticated successfully and access the non-IMS service provided by the AS when comparison of the received second RES with the generated third RES shows consistency;

the AS is further configured to transmit the second RAND transmitted from the IMS user equipment to the authentication gateway and to transmit the second RES transmitted from the authentication gateway to the IMS user equipment; and the authentication gateway is further configured to receive the second RAND transmitted from the AS, to generate the second RES from the received second RAND and the acquired authentication data and to transmit the generated second RES to the AS.

In the system according to the invention, when the IMS user equipment accesses the non-IMS service through an IE explorer, the AS transmits a session identifier (SessionID) to the IMS user equipment being authenticated, which is stored in a cookie of the IE explorer and can simply be retrieved directly by the IMS user equipment accessing the non-IMS service through the IE explorer without being filled in the IE explorer, where the SessionID can be generated by the authentication gateway and then transmitted to the AS or generated by the AS.

As can be apparent from the foregoing process flow, the authentication system in the technical solution according to the embodiment of the invention includes an AS providing a non-IMS service, an authentication gateway and an IMS user equipment, where the AS forwards a connection request message transmitted from the IMS user equipment to the authentication gateway, the authentication gateway transmits an acquired first RAND to the IMS user equipment through the AS, the IMS user equipment generates a first RES from the first RAND and transmits the generated first RES to the authentication gateway through the AS, and when comparison of the received first RES with an acquired XRES shows consistency, the authentication gateway ascertains that the IMS user equipment has been authenticated successfully and instructs the AS to provide the IMS user equipment with the non-IMS service. As can be apparent in the authentication system according to the invention, the IMS user equipment is authenticated by the authentication gateway, thereby improving effectively the service processing efficiency of the AS and enabling the AS providing the non-IMS service to authenticate the IMS user equipment simply and uniformly without requiring the IMS user equipment to negotiate with each AS providing a non-IMS service about an authentication mechanism, thus making authentication easy to perform.

Furthermore, since the authentication parameters/the authentication data of the IMS user equipment are/is stored in the authentication gateway or retrieved by the authentication gateway from the HSS instead of being stored in each AS providing a non-IMS service, the authentication data of the IMS user equipment will not be leaked, thereby improving the reliability of authentication and the security of a subsequent access to the non-IMS service.

Figure 5:
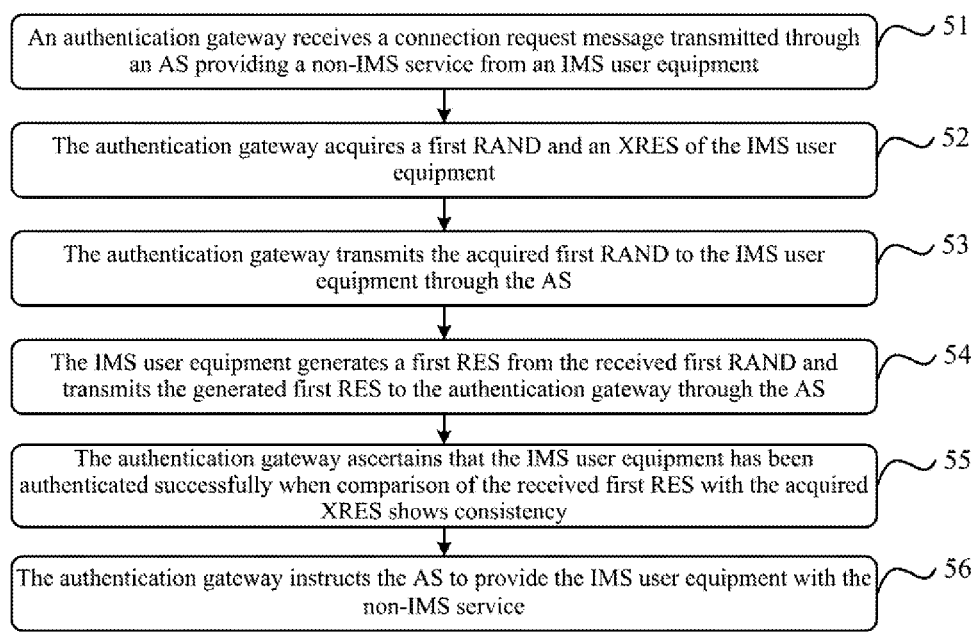
FIG. 5 is a schematic flow chart of an authentication method according to an embodiment of the invention.

Following the authentication system illustrated in FIG. 4, an embodiment of the invention provides an authentication method as illustrated in FIG. 5, and a specific process flow thereof is as follows.

In the step 51, an authentication gateway receives a connection request message transmitted through an AS providing a non-IMS service from an IMS user equipment.

In an embodiment of the invention, the connection request message can include but will not be limited to an HTTP message.

The IMS user equipment shall be registered with an IMS system before transmitting the connection request message to the AS in a specific registration flow as in the prior art, and a repeated description thereof will be omitted here.

In the step 52, the authentication gateway acquires a first RAND and an XRES of the IMS user equipment.

A specific implementation flow in which the authentication gateway acquires the first RAND and the XRES can include but will not be limited to the following two implementation scenarios.

In a first implementation scenario, the authentication gateway acquires authentication parameters of the IMS user equipment, including the first RAND and the XRES of the IMS user equipment, where the authentication gateway can acquire the authentication parameters from an HSS (but not limited thereto), then the connection request message received by the authentication gateway carries an IMPU of the IMS user equipment, the authentication gateway transmits a retrieval request carrying the IMPU to the HSS, and the HSS searches, by the received IMPU, stored correspondence relationships between IMPUs and authentication parameters for the authentication parameters corresponding to the received IMPU and transmits the retrieved authentication parameters to the authentication gateway, where the authentication parameters retrieved by the HSS can include 5-tuple authentication parameters or triplet authentication parameters. If the authentication parameters acquired by the authentication gateway include 5-tuple authentication parameters, the authentication parameters include the first RAND, a first AUTN, a Cipher Key (CK), an Integrity Key (IK) and the XRES.

In a second implementation scenario, the authentication gateway generates the first RAND and acquires authentication data of the IMS user equipment and then generates the XRES from the generated first RAND and the acquired authentication data, where the authentication gateway can acquire the authentication data from an HSS (but not limited thereto), then the connection request message received by the authentication gateway carries an IMPU of the IMS user equipment, the authentication gateway transmits a retrieval request carrying the IMPU to the HSS, and the HSS searches, by the received IMPU, stored correspondence relationships between IMPUs and authentication data for the authentication data corresponding to the received IMPU and transmits the retrieved authentication data to the authentication gateway.

In this step, the HSS will not transmit any authentication parameter or authentication data to the AS, thereby preventing eavesdropping or falsification while the IMS user equipment is authenticated to improve the security of authentication.

In the step 53, the authentication gateway transmits the acquired first RAND to the IMS user equipment through the AS.

If only authentication of the AS on the IMS user equipment is required, the authentication gateway will simply transmit the first RAND to the IMS user equipment, or if also authentication of the IMS user equipment on the AS is required, i.e., bidirectional authentication is required, then:

In a first implementation scenario, the authentication gateway will further transmit the first AUTN carried in the acquired authentication parameters to the IMS user equipment for the IMS user equipment to authenticate the AS, and the IMS user equipment generates a second AUTN from the first RAND and ascertains that the AS has been authenticated successfully when comparison of the generated second AUTN with the received first AUTN shows consistency, where the authentication gateway can transmit the first AUTN together with the first RAND or firstly the first RAND and then the first AUTN or firstly the first AUTN and then the first RAND to the IMS user equipment (but not limited thereto) as long as the first AUTN is transmitted before the authentication gateway receives a first RES through the AS from the IMS user equipment.

In a second implementation scenario, the IMS user equipment generates a second RAND and transmits the generated second RAND to the authentication gateway through the AS, the authentication gateway generates a second RES from the second RAND and the authentication data of the IMS user equipment and transmits the second RES to the IMS user equipment through the AS, and the IMS user equipment generates a third RES from the generated second RAND and its own authentication data, and when comparison of the generated third RES with the received second RES shows consistency, the IMS user equipment ascertains that the AS has been authenticated successfully and can access the non-IMS service provided by the AS.

In the step 54, the IMS user equipment generates the first RES from the received first RAND and transmits the generated first RES to the authentication gateway through the AS.

The IMS user equipment calculates the first RES in a preset first algorithm upon reception of the first RAND and can further calculate a CK from the received first RAND in a second algorithm and calculate an IK from the received first RAND in a third algorithm, so that both the authentication gateway and the IMS user equipment possess the CK and the IK.

The IMS user equipment transmits the calculated first RES to the authentication gateway through the AS for the authentication gateway to authenticate the IMS user equipment.

In the step 55, the authentication gateway ascertains that the IMS user equipment has been authenticated successfully when comparison of the received first RES with the acquired XRES shows consistency.

In this step, authentication fails if the result of comparison shows inconsistency.

In the step 56, the authentication gateway instructs the AS to provide the IMS user equipment with the non-IMS service.

The authentication gateway can transmit the result of successful authentication directly to the AS upon ascertaining that the IMS user equipment has been authenticated successfully, and the AS establishes a connection with the IMS user equipment upon reception of the result of successful authentication and provides the IMS user equipment with the non-IMS service over the established connection, where the authentication gateway can carry the result of successful authentication in a 200OK message and transmit the message to the AS (but not limited thereto).

If the IMS user equipment accesses the non-IMS service through an IE explorer, the IE explorer can not retrieve automatically the authentication data of the IMS user equipment being authenticated but a user has to fill it in, thus resulting in a poor use experience of the user. Therefore, such an authentication process on the IMS user equipment has also been modified according to the invention. The AS transmits a SessionID to the IMS user equipment, which is stored in a Cookie of the IE explorer, that is, the AS sets the Cookie of the IE explorer to be started by the IMS user equipment according to the SessionID, and the IMS user equipment accessing the non-IMS service through the IE explorer can simply retrieve the cookie directly without filling again in the IE explorer, where the SessionID can be generated by the authentication gateway and then transmitted to the AS or generated by the AS.

More particular embodiments will be given below.

Figure 6:
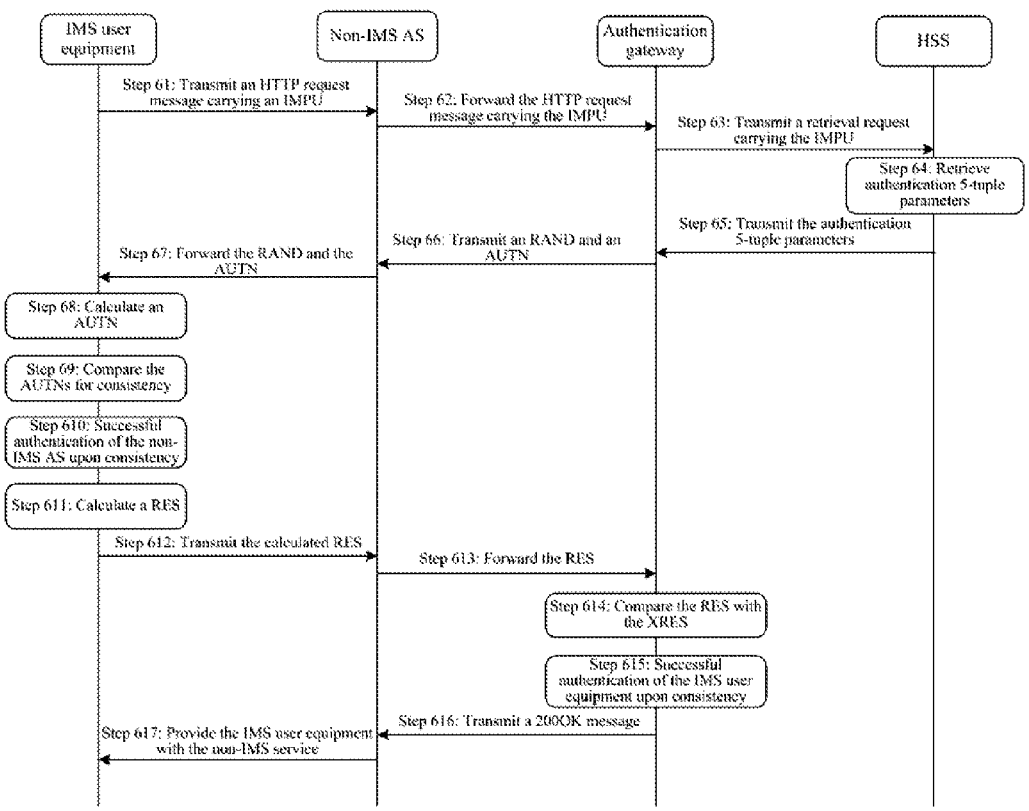
FIG. 6 is a schematic flow chart of a method for an AS providing a non-IMS service to authenticate an IMS user equipment according to a first embodiment of the invention.

Reference is made to FIG. 6 illustrating a flow chart of a method for an AS providing a non-IMS service (a non-IMS AS) to authenticate an IMS user equipment according to a first embodiment of the invention, and a specific process flow thereof is as follows.

In the step 61, an IMS user equipment transmits an HTTP request message carrying an IMPU to a non-IMS AS.

In the step 62, the non-IMS AS forwards the received HTTP request message to an authentication gateway.

In the step 63, the authentication gateway carries the received IMPU in a retrieval request and transmits the retrieval request to an HSS.

In the step 64, the HSS searches, by the received IMPU, correspondence relationships between IMPUs and 5-tuple authentication parameters for corresponding 5-tuple authentication parameters.

In the step 65, the HSS transmits the retrieved 5-tuple authentication parameters to the authentication gateway.

In the step 66, the authentication gateway transmits an RAND and an AUTN in the received 5-tuple authentication parameters to the non-IMS AS.

In the step 67, the non-IMS AS transmits the received RAND and AUTN to the IMS user equipment.

In the step 68, the IMS user equipment calculates an AUTN from the received RAND.

In the step 69, the IMS user equipment compares the calculated AUTN with the received AUTN for consistency.

In the step 610, it is ascertained that the non-IMS AS has been authenticated successfully if the result of comparison in the step 69 shows consistency.

In the step 611, the IMS user equipment calculates an RES from the received RAND.

In the step 612, the IMS user equipment transmits the calculated RES to the non-IMS AS.

In the step 613, the non-IMS AS forwards the received RES to the authentication gateway.

In the step 614, the authentication gateway compares the received RES with a received XRES.

In the step 615, it is ascertained that the IMS user equipment has been authenticated successfully if the result of comparison shows consistency.

In the step 616, the authentication gateway carries the result of successful authentication in a 200OK message and transmits the 200OK message to the non-IMS AS.

In the step 617, the non-IMS AS provides the IMS user equipment with a non-IMS service.

Figure 7:
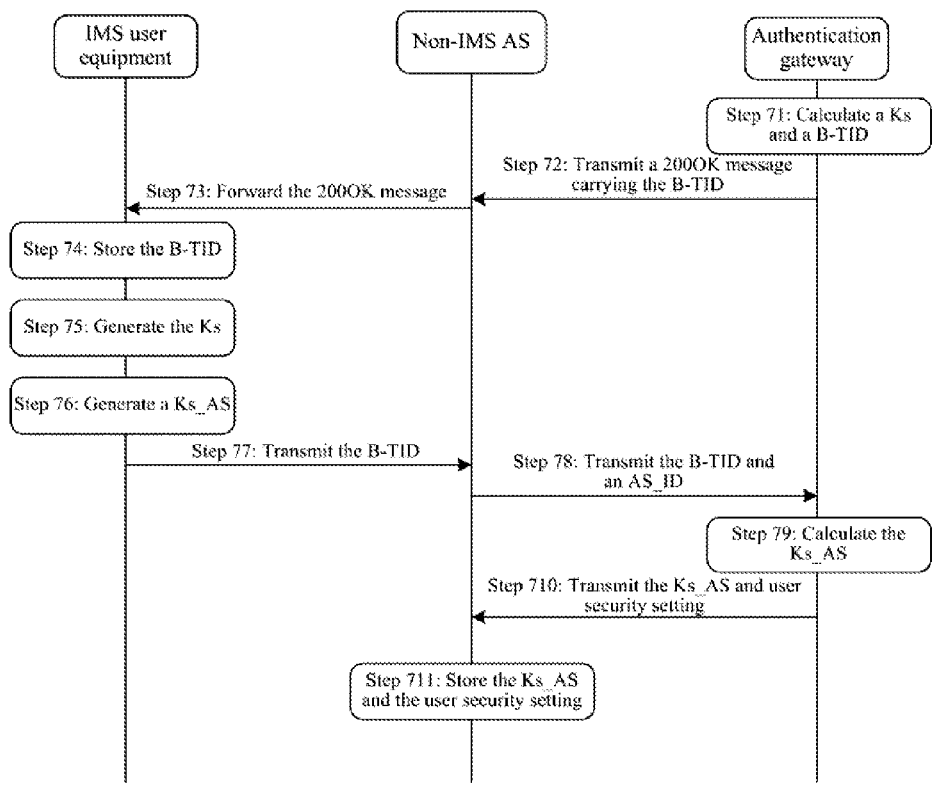
FIG. 7 is a schematic flow chart of a method for generating a shared key according to a second embodiment of the invention.

Furthermore, the authentication gateway and the IMS user equipment can determine a shared key required for the IMS user equipment to subsequently access the non-IMS service so that the IMS user equipment can subsequently access the non-IMS service without performing the foregoing authentication process in the first embodiment, where the shared key is determined after the non-IMS AS has authenticated the IMS user equipment. Reference is made to FIG. 7 illustrating a flow chart of a method for generating a shared key according to a second embodiment of the invention, and a specific process flow thereof is as follows.

In the step 71, an authentication gateway calculates a key Ks from a CK and an IK included in acquired authentication parameters and generates a Bootstrapping Transaction Identifier (B-TID) from an RAND and the identifier of an AS (AS_ID) and further defines a period of validity for the Ks primarily for the purpose of updating the Ks.

In the step 72, the authentication gateway carries the B-TID and information of the period of validity in a 200OK message and transmits the 200OK message to the non-IMS AS, that is, the authentication gateway allocates a B-TID to identify current authentication with an IMS user equipment and associates the B-TID with the Ks so that the Ks can subsequently be retrieved by the B-TID.

In the step 73, the non-IMS AS forwards the received 200OK message to the IMS user equipment.

In the step 74, the IMS user equipment stores the acquired B-TID and information of the period of validity upon reception of the 200OK message.

In the step 75, the IMS user equipment generates the Ks for use as a root key to derive a shared key for communication with the AS. Then both the IMS user equipment and the authentication gateway possess the Ks.

In the step 76, the IMS user equipment calculates a shared key Ks_AS from its own IMS Private User Identity (IMPI), the Ks, and the RAND via a key derivation function.

In the step 77, the IMS user equipment transmits the B-TID to the non-IMS AS.

In the step 78, the non-IMS AS transmits the B-TID and the AS_ID to the authentication gateway.

In the step 79, the authentication gateway authenticates the AS_ID for validity and calculates the shared key Ks_AS.

In the step 710, the authentication gateway transmits the shared key Ks_AS and user security setting to the non-IMS AS.

In the step 711, the non-IMS AS stores the shared key Ks_AS and the user security setting, so that the non-IMS AS and the IMS user equipment possess the shared key Ks_AS, and the non-IMS AS authenticates the IMS user equipment by the shared key Ks_AS when the IMS user equipment subsequently accesses a non-IMS service.

Figure 8:
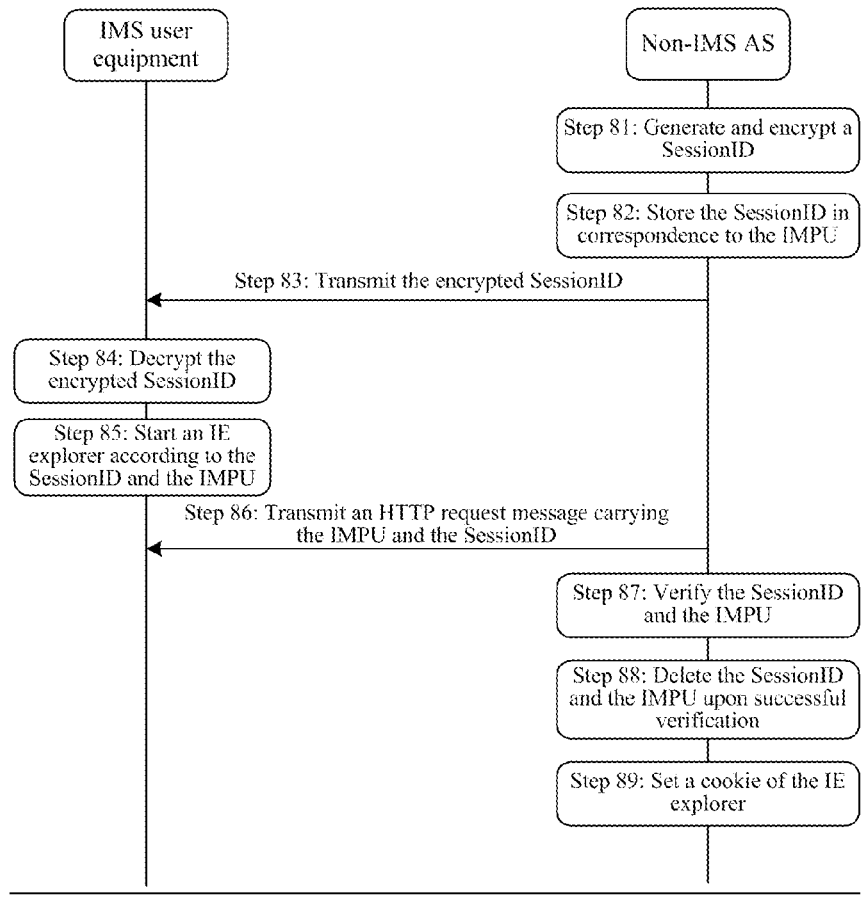
FIG. 8 is a schematic flow chart of a method for setting a cookie of an IE explorer according to a third embodiment of the invention.

If the IMS user equipment accesses the non-IMS service through an IE explorer, that is, the IMS user equipment is provided with an IE explorer, the non-IMS AS shall set a cookie of the IE explorer before providing the IMS user equipment with the non-IMS service. Reference is made to FIG. 8 illustrating a flow chart of a method for setting a cookie of an IE explorer according to a third embodiment of the invention, and a specific process flow thereof is as follows.

In the step 81, a non-IMS AS generates a SessionID and encrypts the generated SessionID by a received shared key Ks_AS.

In the step 82, the non-IMS AS stores the generated SessionID in correspondence to an IPMU of an IMS user equipment.

In the step 83, the non-IMS AS transmits the encrypted SessionID to the IMS user equipment.

In the step 84, the IMS user equipment decrypts the received encrypted SessionID by a calculated shared key Ks_AS.

In the step 85, the IMS user equipment starts an IE explorer according to the decrypted SessionID and its own IMPU.

In the step 86, the IMS user equipment transmits an HTTP request message carrying its own IMPU and the decrypted SessionID to the non-IMS AS in the IE explorer.

In the step 87, the non-IMS AS verifies the received IMPU and SessionID against stored correspondence relationships between SessionIDs and IMPUs.

In the step 88, the received IMPU and SessionID are deleted from the correspondence relationships between SessionIDs and IMPUs upon successful verification, thereby preventing a replay attack.

In the step 89, the non-IMS AS sets a cookie of the IE explorer started by the EMS user equipment according to the received IMPU and SessionID.

Figure 9:
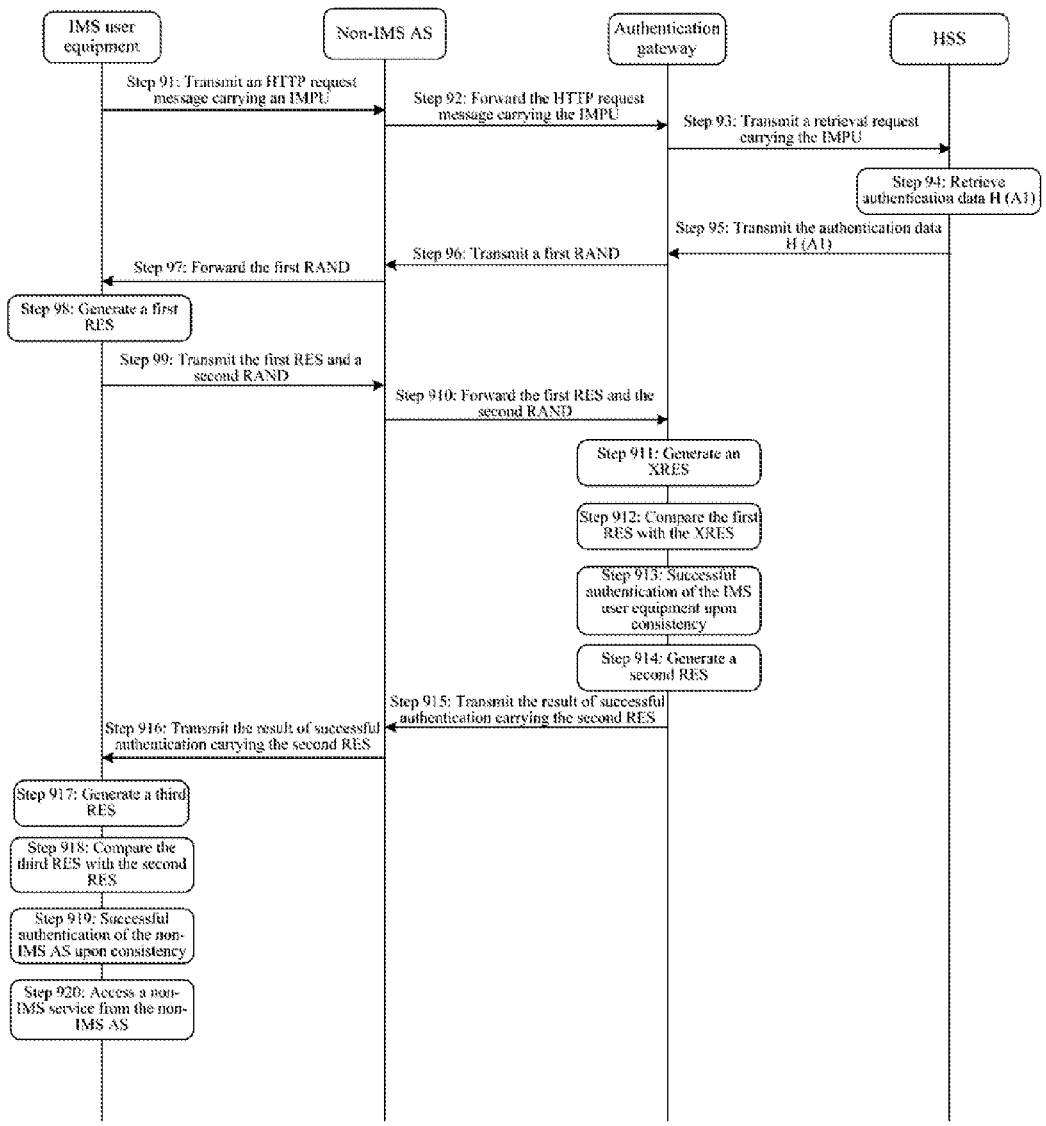
FIG. 9 is a schematic flow chart of a method for an IMS user equipment to access a non-IMS service according to a fourth embodiment of the invention.

Reference is made to FIG. 9 illustrating a flow chart of a method for authenticating an IMS user equipment accessing a non-IMS service according to a fourth embodiment of the invention, where authentication data of the IMS user equipment is represented as H (A1), and a specific process flow thereof is as follows.

In the step 91, an IMS user equipment transmits to a non-IMS AS an HTTP request message carrying an IMPU identifying the IMS user equipment uniquely in an IMS system.

In the step 92, the non-IMS AS forwards the received HTTP request message to an authentication gateway.

In the step 93, the authentication gateway carries the received IMPU in a retrieval request and transmits the retrieval request to an HSS.

In the step 94, the HSS searches, by the received IMPU, correspondence relationships between IMPUs and authentication data for corresponding authentication data, and in this step, retrieves the authentication data H (A1).

In the step 95, the HSS transmits the retrieved H (A1) to the authentication gateway.

In the step 96, the authentication gateway transmits a generated first RAND to the non-IMS AS.

In the step 97, the non-IMS AS transmits the received first RAND to the IMS user equipment.

In the step 98, the IMS user equipment generates a first RES from the received first RAND and its own stored H (A1).

In the step 99, the IMS user equipment transmits the generated first RES and a second RAND to the non-IMS AS.

In the step 910, the non-IMS AS forwards the first RES and the second RAND to the authentication gateway.

In the step 911, the authentication gateway generates an XRES from the H (A1) transmitted from the HSS and its own generated first RAND.

In the step 912, the authentication gateway compares the generated XRES with the acquired first RES.

In the step 913, it is ascertained that the IMS user equipment has been authenticated successfully if the result of comparison shows consistency.

In the step 914, the authentication gateway generates a second RES from the received second RAND and the H (A1) transmitted from the HSS.

In the step 915, the authentication gateway carries the generated second RES in the result of successful authentication and transmits the result of successful authentication to the non-IMS AS.

In the step 916, the non-IMS AS transmits the result of successful authentication to the IMS user equipment.

In the step 917, the IMS user equipment generates a third RES from the generated second RAND and its own stored H (A1).

In the step 918, the IMS user equipment compares the generated third RES with the received second RES.

In the step 919, it is ascertained that the non-IMS AS has been authenticated successfully if the result of comparison shows consistency.

In the step 920, the IMS user equipment establishes a connection with the non-IMS AS and accesses a non-IMS service from the non-IMS AS.

Figure 10:
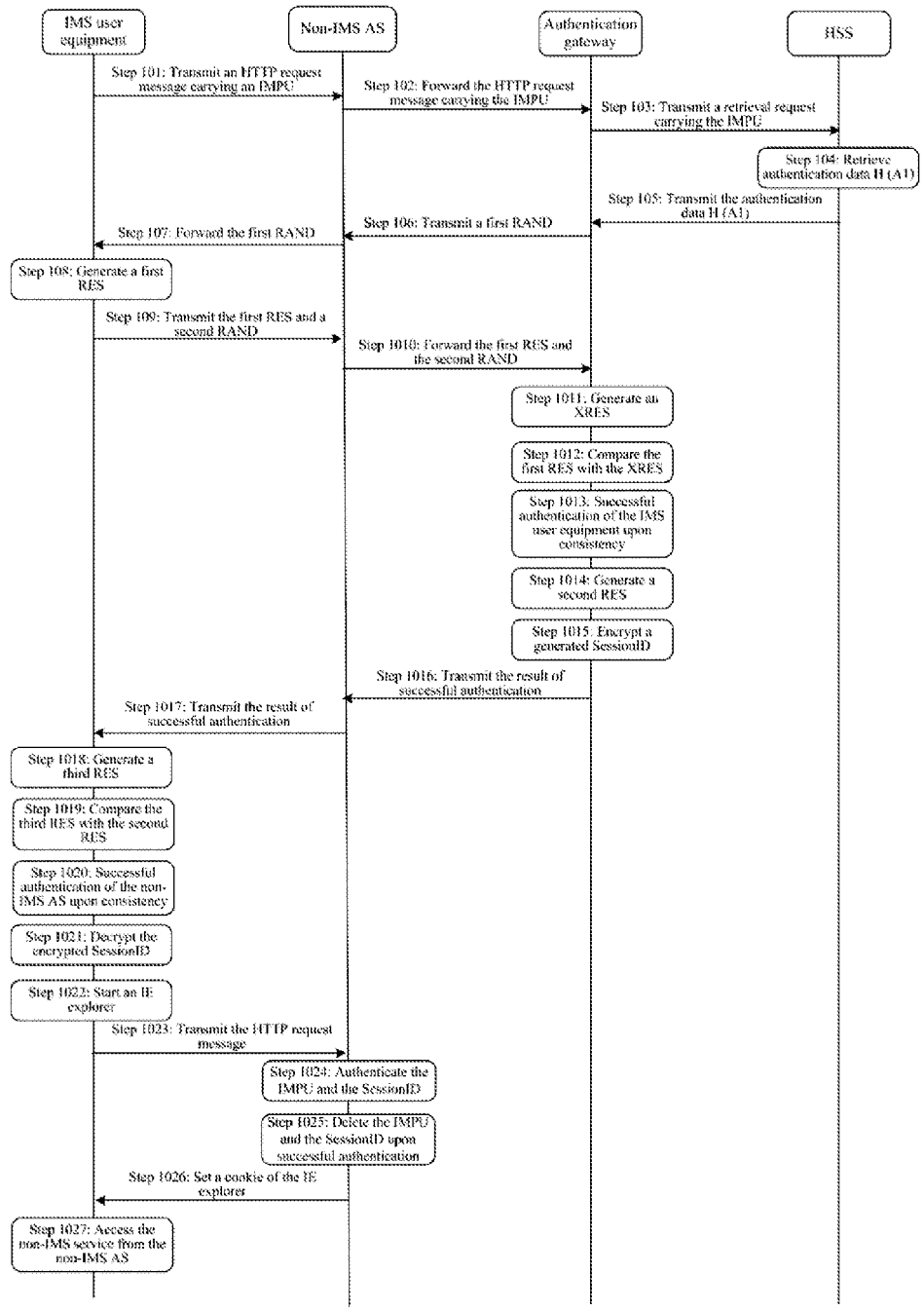
FIG. 10 is a schematic flow chart of a method for an IMS user equipment with an IE explorer to access a non-IMS service according to a fifth embodiment of the invention.

If the IMS user equipment accesses the non-IMS service through an IE explorer, that is, the IMS user equipment is provided with an IE explorer, in the fourth embodiment of the invention, reference is made to FIG. 10 illustrating a flow chart of a method for authenticating an IMS user equipment, provided with an IE explorer, accessing a non-IMS service according to a fifth embodiment of the invention, and a specific process flow thereof is as follows.

In the step 101, an IMS user equipment transmits an HTTP request message carrying an IMPU to a non-IMS AS.

In the step 102, the non-IMS AS forwards the received HTTP request message to an authentication gateway.

In the step 103, the authentication gateway carries the received IMPU in a retrieval request and transmits the retrieval request to an HSS.

In the step 104, the HSS searches, by the received IMPU, correspondence relationships between IMPUs and authentication data for corresponding authentication data, and in this step, retrieves the authentication data H (A1).

In the step 105, the HSS transmits the retrieved H (A1) to the authentication gateway.

In the step 106, the authentication gateway transmits a generated first RAND to the non-IMS AS.

In the step 107, the non-IMS AS transmits the received first RAND to the IMS user equipment.

In the step 108, the IMS user equipment generates a first RES from the first RAND and its own stored H (A1).

In the step 109, the IMS user equipment transmits the generated first RES and a generated second RAND to the non-IMS AS.

In the step 1010, the non-IMS AS forwards the first RES and the second RAND to the authentication gateway.

In the step 1011, the authentication gateway generates an XRES from the H (A1) transmitted from the HSS and the generated first RAND.

In the step 1012, the authentication gateway compares the generated XRES with the acquired first RES.

In the step 1013, it is ascertained that the IMS user equipment has been authenticated successfully if the result of comparison shows consistency.

In the step 1014, the authentication gateway generates a second RES from the received second RAND and the H (A1) transmitted from the HSS.

In the step 1015, the authentication gateway encrypts a generated SessionID by the H (A1) transmitted from the HSS into an $E_{H(A1)}$(SessionID).

In the step 1016, the authentication gateway carries the generated second RES, SessionID and $E_{H(A1)}$(SessionID) in the result of successful authentication and transmits the result of successful authentication to the non-IMS AS.

In the step 1017, the non-IMS AS carries the second RES and the $E_{H(A1)}$(SessionID) in the result of successful authentication, transmits the result of successful authentication to the IMS user equipment and stores a correspondence relationship between the IMPU and the SessionID.

In the step 1018, the IMS user equipment generates a third RES from its own generated second RAND and stored H (A1).

In the step 1019, the IMS user equipment compares the generated third RES with the received second RES.

In the step 1020, it is ascertained that the non-IMS AS has been authenticated successfully if the result of comparison shows consistency.

In the step 1021, the IMS user equipment decrypts the $E_{H(A1)}$(SessionID) by its own stored H (A1) into the SessionID.

In the step 1022, the IMS user equipment starts an IE explorer with the decrypted SessionID and the IMPU being parameters of a Universal Resource Locator (URL).

In the step 1023, the IMS user equipment transmits the HTTP request message carrying its own IMPU and the decrypted SessionID to the non-IMS AS in the IE explorer.

In the step 1024, the non-IMS AS authenticates the received IMPU and SessionID against the stored correspondence relationships between IMPUs and SessionIDs upon reception of the HTTP request message.

In the step 1025, the received IMPU and SessionID are deleted from correspondence relationships between IMPUs and SessionIDs upon successful authentication, thereby preventing a replay attack.

In the step 1026, the non-IMS AS sets a cookie of the IE explorer started by the IMS user equipment according to the received IMPU and SessionID.

Subsequently to this step, the IMS user equipment starting the IE explorer requests directly the non-IMS AS for authentication by the cookie instead of authentication in the foregoing steps.

In the step 1027, the IMS user equipment establishes a connection with the non-IMS AS and accesses a non-IMS service from the non-IMS AS.

In the foregoing two processes, since the non-IMS AS may be in an un-trusted domain and the authentication gateway is a network element in the IMS system, information interaction can be performed between the authentication gateway and the non-IMS AS over an established transport layer security/Internet Protocol security tunnel in order to ensure the security of the authentication gateway.

In the fourth embodiment of the invention, the authentication gateway can further encrypt the authentication data H (A1) of the IMS user equipment, for example, into H (A1)' by a domain name of the non-IMS AS, and then transmit the H (A1)' to the non-IMS AS, and subsequently the non-IMS AS can adopt the H (A1)' for authentication with the IMS user equipment, thereby enhancing the function of the non-IMS AS. This solution will be described below by taking a general IMS user equipment and an IMS user equipment with an IE explorer respectively as an example.

Figure 11:
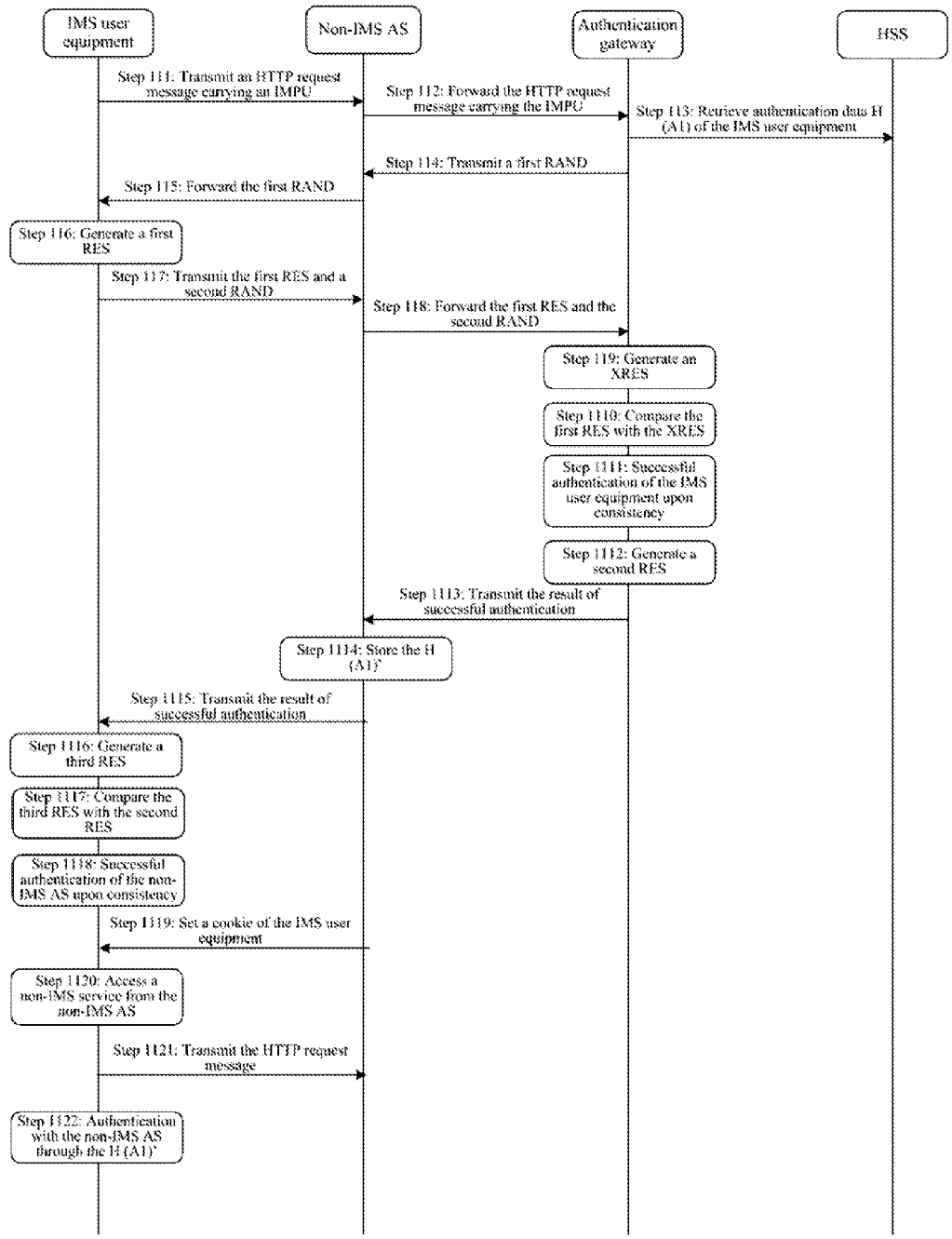
FIG. 11 is a schematic flow chart of a method for authenticating an IMS user equipment accessing a non-IMS service according to a sixth embodiment of the invention.

FIG. 11 is a flow chart of a method for authenticating an IMS user equipment accessing a non-IMS service according to a sixth embodiment of the invention, and a specific process flow is as follows.

In the step 111, an IMS user equipment transmits an HTTP request message carrying an IMPU to a non-IMS AS.

In the step 112, the non-IMS AS judges whether there is stored H (A1)' corresponding to the IMPU, and if so, it directly generates and transmits a first RAND to the IMS user equipment and performs authentication with the IMS user equipment as in the prior art, and a repeated description thereof will be omitted here;

Otherwise, the non-IMS AS forwards the received HTTP request message to an authentication gateway.

In the step 113, the authentication gateway retrieves, by the received IMPU, authentication data of the IMS user equipment from an HSS.

Specifically, the authentication gateway transmits an LIR message to the HSS to inquiry about a Fully Qualified Domain Name (FQDN) of an S-CSCF with which the IMPU is currently registered;

The HSS transmits an LIA message to the authentication gateway;

The authentication gateway judges as follows for the LIA message returned from the HSS: if the IMPU is a wildcard IMPU, the authentication gateway transmits a failure response to the non-IMS AS; if the IMS user equipment corresponding to the IMPU has not been registered with an IMS system, the authentication gateway returns a failure response to the non-IMS AS; or if the IMS user equipment corresponding to the IMPU has been registered successfully, the authentication gateway acquires from the LIA message the FQDN of the S-CSCF registering the IMS user equipment;

The authentication gateway searches correspondence relationships between IMPUs and IMPIs for an IMPI of the IMS user equipment;

The authentication gateway transmits a Multimedia Authentication Request (MAR) message carrying the IMPU, the IMPI and the FQDN to the HSS; and The HSS returns a Multimedia Authentication Answer (MAA) message carrying the authentication data H (A1) of the IMS user equipment.

In the step 114, the authentication gateway stores the H (A1) of the IMS user equipment and transmits the generated first RAND to the non-IMS AS.

In the step 115, the non-IMS AS transmits the first RAND generated by the authentication gateway to the IMS user equipment.

In the step 116, the IMS user equipment generates a first RES from its own stored H (A1) and the received first RAND.

In this step, the IMS user equipment can further encrypt the H (A1) into H (A1)' by an FQDN of the non-IMS AS (i.e., $FQDN_{AS}$) via an MD5 encryption algorithm.

In the step 117, the IMS user equipment returns the generated first RES and a second RAND generated by the IMS user equipment to the non-IMS AS.

In the step 118, the non-IMS AS forwards the first RES and the second RAND to the authentication gateway.

In the step 119, the authentication gateway generates an XRES from the H (A1) and the first RAND.

In the step 1110, the generated XRES is compared with the received first RES.

In the step 1111, it is ascertained that the IMS user equipment has been authenticated successfully if the result of comparison shows consistency.

In the step 1112, the authentication gateway generates a second RES from the received second RAND and H (A1).

In this step, the authentication gateway can further encrypt the H (A1) into H (A1)' by the $FQDN_{AS}$ of the non-IMS AS via the MD5 encryption algorithm.

In the step 1113, the authentication gateway carries the generated second RES and H (A1)' in the result of successful authentication and transmits the result of successful authentication to the non-IMS AS.

In the step 1114, the non-IMS AS stores the received H (A1)' in correspondence to the IMPU of the IMS user equipment.

In the step 1115, the non-IMS AS transmits the result of successful authentication carrying the second RES to the IMS user equipment.

In the step 1116, the IMS user equipment generates a third RES from its own generated second RAND and stored H (A1).

In the step 1117, the generated third RES is compared with the received second RES.

In the step 1118, it is ascertained that the non-IMS AS has been authenticated successfully if the result of comparison shows consistency.

In the step 1119, the non-IMS AS sets a cookie of the IMS user equipment.

In the step 1120, the IMS user equipment establishes a connection with the non-IMS AS and accesses a non-IMS service from the non-IMS AS.

In the step 1121, the IMS user equipment subsequently accessing the non-IMS AS carries the set cookie.

In the step 1122, after the cookie is invalided, authentication is performed between the IMS user equipment and the non-IMS AS through the H (A1)' when the IMS user equipment accesses the non-IMS AS without involving the authentication gateway, thereby saving the steps of and the period of time for authentication.

In the foregoing process, an interface Cx or an interface Zh is also adopted between the authentication gateway and the HSS in addition to the interface Sh to inquire about the FQDN of the S-CSCF with which the IMS user equipment is currently registered, where the $FQDN_{AS}$ refers to an FQDN of the current S-CSCF of the IMS user equipment when the interface Cx is adopted between the authentication gateway and the HSS, or an FQDN of the authentication gateway can be adopted directly for the non-IMS AS when the interface Zh is adopted between the authentication gateway and the HSS.

Figure 12:
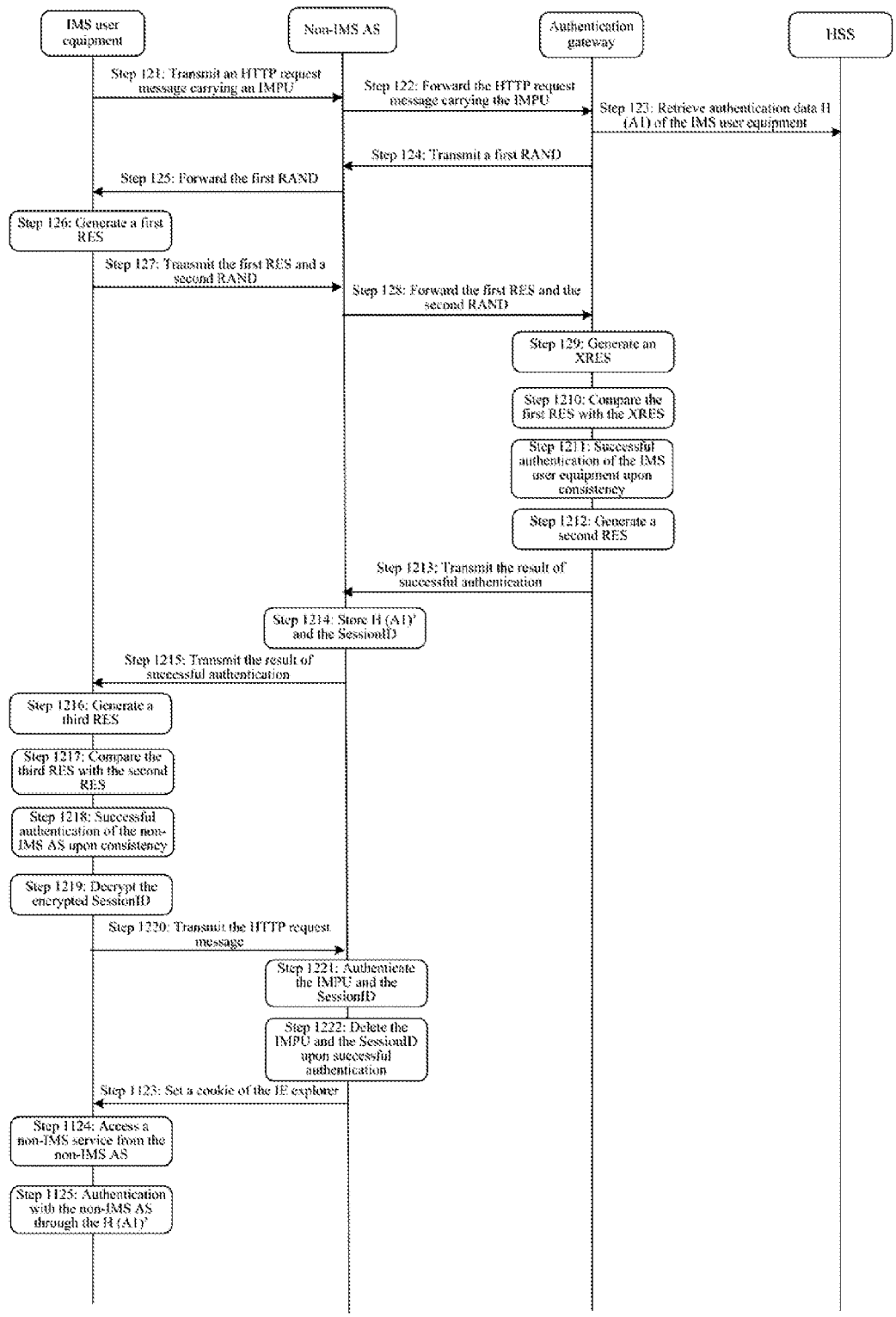
FIG. 12 is a schematic flow chart of a method for authenticating an IMS user equipment with an IE explorer accessing a non-IMS service according to a seventh embodiment of the invention.

Reference is made to FIG. 12 illustrating a flow chart of a method for authenticating an IMS user equipment with an IE explorer accessing a non-IMS service according to a seventh embodiment of the invention, and a specific process flow is as follows.

In the step 121, an IMS user equipment transmits an HTTP request message carrying an IMPU to a non-IMS AS.

In the step 122, the non-IMS AS judges whether there is stored H (A1)' corresponding to the IMPU, and if so, it directly generates and transmits a first RAND to the IMS user equipment and performs authentication with the IMS user equipment as in the prior art, and a repeated description thereof will be omitted here;

Otherwise, the non-IMS AS forwards the received HTTP request message to an authentication gateway.

In the step 123, the authentication gateway retrieves, by the received IMPU, authentication data H (A1) of the IMS user equipment from an HSS.

In the step 124, the authentication gateway stores the H (A1) of the IMS user equipment and transmits a generated first RAND to the non-IMS AS.

In the step 125, the non-IMS AS transmits the first RAND generated by the authentication gateway to the IMS user equipment.

In the step 126, the IMS user equipment generates a first RES from its own stored H (A1) and the received first RAND.

In this step, the IMS user equipment can further encrypt the H (A1) into H (A1)' by an $FQDN_{AS}$ of the non-IMS AS in an MD5 encryption algorithm.

In the step 127, the IMS user equipment returns the generated first RES and a generated second RAND to the non-IMS AS.

In the step 128, the non-IMS AS forwards the first RES and the second RAND to the authentication gateway.

In the step 129, the authentication gateway generates an XRES from the H (A1) of the IMS user equipment and the first RAND.

In the step 1210, the generated XRES is compared with the received first RES.

In the step 1211, it is ascertained that the IMS user equipment has been authenticated successfully if the result of comparison shows consistency.

In the step 1212, the authentication gateway generates a second RES from the received second RAND and H (A1) of the IMS user equipment.

In this step, the authentication gateway further generates a SessionID as a session identifier for the non-IMS AS to interact once with an IE explorer of the IMS user equipment and encrypts the generated SessionID by the H (A1) into $E_{H(A1)}$(SessionID); and the authentication gateway can further encrypt the H (A1) into H (A1)' by the $FQDN_{AS}$ of the non-IMS AS in an MD5 encryption algorithm.

In the step 1213, the authentication gateway carries the generated second RES, H (A1)' and $E_{H(A1)}$(SessionID) in the result of successful authentication and transmits the result of successful authentication to the non-IMS AS.

In the step 1214, the non-IMS AS stores the received H (A1)' and the SessionID in correspondence to the IMPU of the IMS user equipment.

In the step 1215, the non-IMS AS transmits the result of successful authentication carrying the second RES and the $E_{H(A1)}$(SessionID) to the IMS user equipment.

In the step 1216, the IMS user equipment generates a third RES from the generated second RAND and SessionID and its own stored H (A1).

In the step 1217, the generated third RES is compared with the received second RES.

In the step 1218, it is ascertained that the non-IMS AS has been authenticated successfully if the result of comparison shows consistency.

In the step 1219, the IMS user equipment decrypts the $E_{H(A1)}$(SessionID) into the SessionID.

In this step, a cookie of the IMS user equipment is also set.

In this step, the result of successful authentication can be included in a 200OK message (but not limited thereto).

In the step 1220, the IMS user equipment starts an IE explorer with the SessionID and the IMPU being as URL parameters and transmits an HTTP request message carrying the IMPU and the SessionID to the IMS AS.

In the step 1221, the non-IMS AS authenticates the received IMPU and SessionID against stored correspondence relationships between IMPUs and the SessionIDs upon reception of the HTTP request message.

In the step 1222, the received IMPU and SessionID are deleted from correspondence relationships between IMPUs and SessionIDs upon successful authentication, thereby preventing a replay attack.

In the step 1223, a cookie of the IE explorer started by the IMS user equipment is set according to the received IMPU and SessionID.

After this step, the IMS user equipment starting the IE explorer requests directly the non-IMS AS for authentication by the cookie instead of authentication in the foregoing steps.

In the step 1224, the IMS user equipment establishes a connection with the non-IMS AS and accesses a non-IMS service from the non-IMS AS.

In the step 1225, after the cookie is invalided, authentication is performed between the IMS user equipment and the non-IMS AS through the H (A1)' when the IMS user equipment accesses the non-IMS AS without involving the authentication gateway, thereby saving the steps and the period of time for authentication.

In the foregoing two embodiments, when the authentication gateway acquires the authentication data of the IMS user equipment from the HSS, the HSS will compare an S-CSCF indicated by a Server-name in an MAR request message transmitted from the authentication gateway with that stored therein for consistency upon reception of the MAR request message and trigger deregistration of the S-CSCF currently serving the IMS user equipment upon inconsistency. In order to address this problem, the method according to the invention can be performed in two schemes.

In a first scheme, a correspondence relationship between the IMPU of the IMS user equipment and the S-CSCF is configured on the authentication gateway, and the authentication gateway carries information of the S-CSCF in the MAR authentication request and forwards the MAR authentication request.

In a second scheme, the authentication gateway upon reception of the connection request transmitted from the non-IMS AS firstly transmits the LIR request message to the HSS to retrieve the S-CSCF currently serving the IMS user equipment and then carries the information of the S-CSCF in the MAR request message.

In the invention, the authentication data of the IMS user equipment and the first RAND are stored in the authentication gateway after the IMS user equipment has been authenticated initially and can be reused for next authentication. The stored information can be updated periodically.

With the authentication system, method and device according to the invention, a uniform authentication platform between an IMS user equipment and different non-IMS ASs is provided to lower the complexity of accessing a non-IMS service and to improve the use experience of a user; there is no authentication parameter/authentication data of the IMS user equipment in the non-IMS ASs, thereby alleviating a burden of authentication process and data maintenance upon the non-IMS ASs; the configured authentication gateway will transmit no authentication parameter/authentication data of the IMS user equipment being authenticated to the non-IMS ASs, thereby preventing from tampering with, eavesdropping of and falsified authentication; and in a process for authenticating an IMS user equipment accessing a non-IMS service via an IE explorer an encrypted SessionID is adopted for transmission to thereby prevent the SessionID from being tampered with, and the transmitted SessionID and stored relationships are processed to thereby prevent a replay attack.

Figure 13:
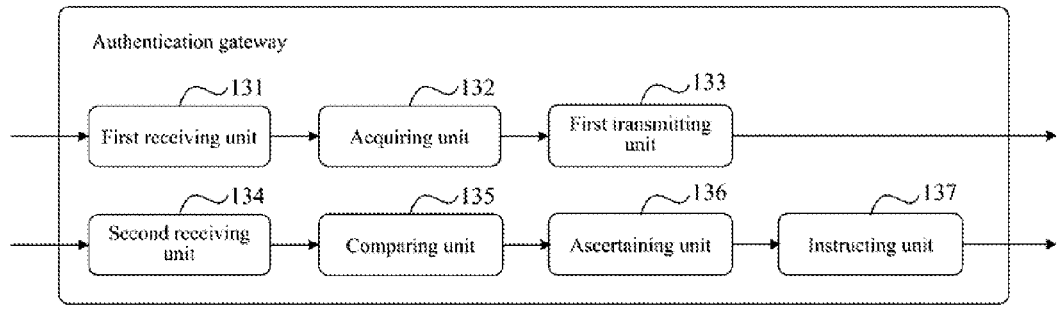
FIG. 13 is a schematic structural diagram of an authentication gateway according to an embodiment of the invention.

An embodiment of the invention provides an authentication gateway as illustrated in FIG. 13, which includes a first receiving unit 131, an acquiring unit 132, a first transmitting unit 133, a second receiving unit 134, a comparing unit 135, a ascertaining unit 136 and an instructing unit 137.

The first receiving unit 131 is configured to receive a connection request message transmitted through an AS providing a non-IMS service from an IMS user equipment.

The acquiring unit 132 is configured to acquire a first RAND and an XRES of the IMS user equipment.

The first transmitting unit 133 is configured to transmit the first RAND acquired by the acquiring unit 132 to the IMS user equipment through the AS.

The second receiving unit 134 is configured to receive a first RES transmitted through the AS from the IMS user equipment, where the first RES is generated by the IMS user equipment from the first RAND.

The comparing unit 135 is configured to compare the first RES received by the second receiving unit 134 with the XRES acquired by the acquiring unit 132 for consistency.

The ascertaining unit 136 is configured to ascertain that the IMS user equipment has been authenticated successfully when the result of comparison by the comparing unit 135 shows consistency.

The instructing unit 137 is configured to instruct the AS to provide the IMS user equipment with the non-IMS service.

Preferably, the acquiring unit 132 acquires authentication parameters of the IMS user equipment, including the first RAND and the XRES of the IMS user equipment.

Preferably, the connection request message received by the first receiving unit 131 carries an IMPU of the IMS user equipment; and the acquiring unit 132 includes:
a transmitting sub-unit configured to transmit a retrieval request carrying the IMPU received by the first receiving unit 131 to an HSS; and
a receiving sub-unit configured to receive the authentication parameters transmitted from the HSS, which are retrieved by the HSS from correspondence relationships between IMPUs and authentication parameters by the IMPU.

Preferably, the authentication parameters acquired by the acquiring unit 132 further include a first AUTN; and the authentication gateway further includes a second transmitting unit configured to transmit the first AUTN acquired by the acquiring unit to the IMS user equipment through the AS before the second receiving unit 134 receives the first RES transmitted through the AS from the IMS user equipment.

Preferably, the authentication gateway further includes:
a determining unit configured to determine a shared key required for the IMS user equipment to subsequently access the non-IMS service before the instructing unit 137 instructs the AS to provide the IMS user equipment with the non-IMS service; and
a third transmitting unit configured to transmit the shared key determined by the determining unit to the AS.

Preferably, the acquiring unit 132 includes a first generating sub-unit, an acquiring sub-unit and a second generating sub-unit, where:
the first generating sub-unit is configured to generate the first RAND;
the acquiring sub-unit is configured to acquire authentication data of the IMS user equipment; and
the second generating sub-unit is configured to generate the XRES of the IMS user equipment from the first RAND generated by the first generating sub-unit and the authentication data acquired by the acquiring sub-unit.

Preferably, the authentication gateway further includes a third receiving unit, a generating unit and a fourth transmitting unit, where:
the third receiving unit is configured to receive a second RAND transmitted through the AS from the IMS user equipment;
the generating unit is configured to generate a second RES from the second RAND received by the third receiving unit and the authentication data acquired by the acquiring sub-unit; and
the fourth transmitting unit is configured to transmit the second RES generated by the generating unit to the IMS user equipment through the AS.

The instructing unit 137 transmits the result of successful authentication to the AS and instructs the AS to provide the IMS user equipment with the non-IMS service.

Figure 14:
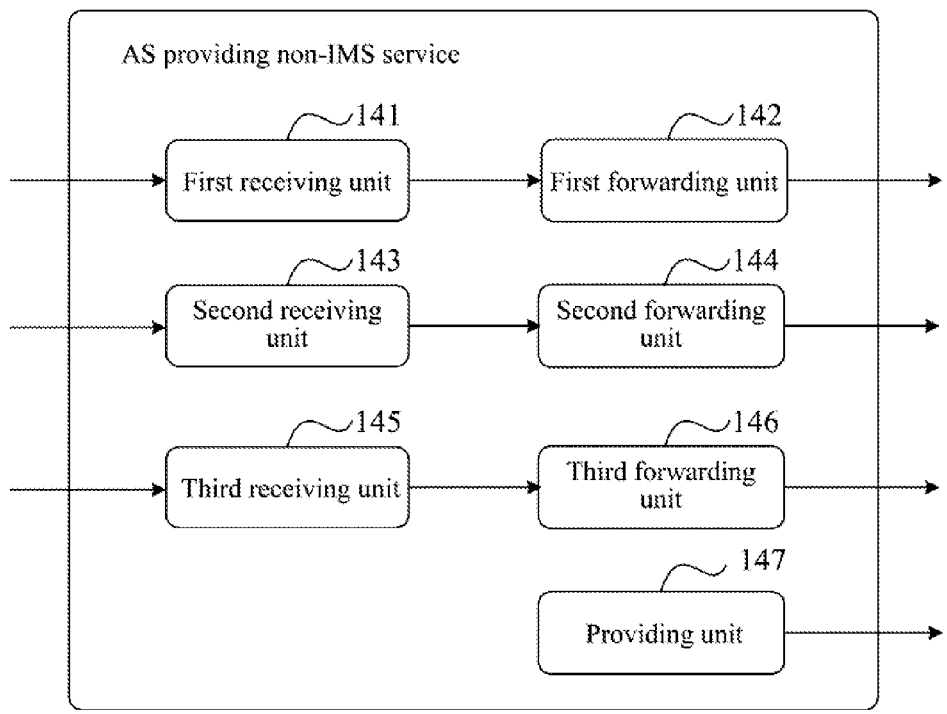
FIG. 14 is a schematic structural diagram of an AS providing a non-IMS service according to an embodiment of the invention.

An embodiment of the invention provides an AS providing a non-IMS service as illustrated in FIG. 14, which includes a first receiving unit 141, a first forwarding unit 142, a second receiving unit 143, a second forwarding unit 144, a third receiving unit 145, a third forwarding unit 146 and a providing unit 147.

The first receiving unit 141 is configured to receive a connection request message transmitted from an IMS user equipment.

The first forwarding unit 142 is configured to forward the connection request message received by the first receiving unit 141 to an authentication gateway.

The second receiving unit 143 is configured to receive a first RAND transmitted from the authentication gateway.

The second forwarding unit 144 is configured to forward the first RAND received by the second receiving unit 143 to the IMS user equipment.

The third receiving unit 145 is configured to receive a first RES transmitted from the IMS user equipment.

The third forwarding unit 146 is configured to forward the first RES received by the third receiving unit 145 to the authentication gateway.

The providing unit 147 is configured to provide the IMS user equipment with the non-IMS service in response to an instruction of the authentication gateway.

Preferably, the AS further includes a fourth receiving unit and a fourth forwarding unit, where:

the fourth receiving unit is configured to receive an AUTN transmitted from the authentication gateway before the third receiving unit 145 receives the first RES; and the fourth forwarding unit is configured to forward the AUTN received by the fourth receiving unit to the IMS user equipment.

Preferably, the providing unit 147 includes:

a receiving sub-unit configured to receive the result of successful authentication transmitted from the authentication gateway;

a connection establishing sub-unit configured to establish a connection with the IMS user equipment after the receiving sub-unit receives the result of successful authentication; and a providing sub-unit configured to provide the IMS user equipment with the non-IMS service over the connection established by the connection establishing sub-unit.

Preferably, the AS further includes a fifth receiving unit configured to receive and store a shared key transmitted from the authentication gateway before the providing unit 147 provides the IMS user equipment with the non-IMS service.

Preferably, if the IMS user equipment accesses the non-IMS service through an IE explorer, the AS further includes:

a generating unit configured to generate a SessionID;

an encrypting unit configured to encrypt the SessionID generated by the generating unit by the shared key received by the fifth receiving unit;

a transmitting unit configured to transmit the SessionID encrypted by the encrypting unit to the IMS user equipment.

a sixth receiving unit configured to receive the connection request message, carrying an IMPU and the SessionID, transmitted from the IMS user equipment; and a setting unit configured to set a cookie of the IE explorer started by the IMS user equipment according to the received IMPU and SessionID received by the sixth receiving unit.

Preferably, the AS further includes:

a storing unit configured to store the SessionID generated by the generating unit in correspondence to the IMPU of the IMS user equipment before the transmitting unit transmits the SessionID encrypted by the encrypting unit to the IMS user equipment.

a verifying unit configured to verify the IMPU and the SessionID received by the sixth receiving unit against the correspondence relationships between SessionIDs and IMPUs in the storing unit before the setting unit sets the cookie of the IE explorer started by the IMS user equipment; and a deleting unit configured to delete the IMPU and the SessionID received by the sixth receiving unit from the correspondence relationships between SessionIDs and IMPUs stored in the storing unit after the result of verification by the verifying unit shows successful verification.

Preferably, the AS further includes a seventh receiving unit, a fifth forwarding unit, an eighth receiving unit and a sixth forwarding unit, where:

the seventh receiving unit is configured to receive a second RAND transmitted from the IMS user equipment;

the fifth forwarding unit is configured to forward the second RAND received by the seventh receiving unit to the authentication gateway;

the eighth receiving unit is configured to receive a second RES transmitted from the authentication gateway; and the sixth forwarding unit is configured to forward the second RES received by the eighth receiving unit to the IMS user equipment.

Figure 15:
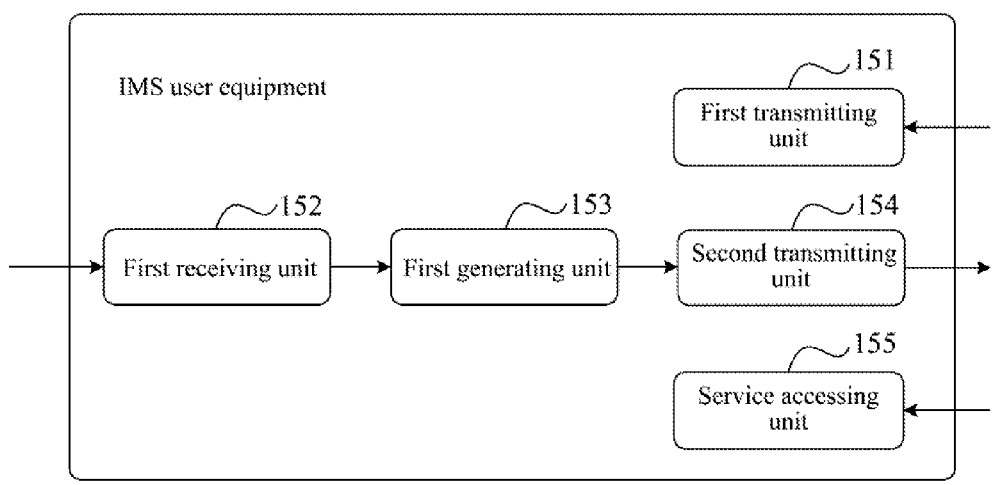
FIG. 15 is a schematic structural diagram of an IMS user equipment according to an embodiment of the invention.

An embodiment of the invention provides an IMS user equipment as illustrated in FIG. 15, which includes a first transmitting unit 151, a first receiving unit 152, a first generating unit 153, a second transmitting unit 154 and a service accessing unit 155.

The first transmitting unit 151 is configured to transmit a connection request message to an AS providing a non-IMS service.

The first receiving unit 152 is configured to receive a first RAND transmitted through the AS from an authentication gateway.

The first generating unit 153 is configured to generate a first RES from the first RAND received by the first receiving unit 152.

The second transmitting unit 154 is configured to transmit the first RES generated by the first generating unit 153 to the AS.

The service accessing unit 155 is configured to access the non-IMS service from the AS.

Preferably, the IMS user equipment further includes a second receiving unit, a second generating unit, a first comparing unit and a first ascertaining unit, where:

the second receiving unit is configured to receive a first AUTN transmitted through the AS from the authentication gateway before the first generating unit 153 generates the first RES;

the second generating unit is configured to generate a second AUTN from the first RAND received by the first receiving unit 152;

the first comparing unit is configured to compare the second AUTN generated by the second generating unit with the first AUTN received by the second receiving unit for consistency; and the first ascertaining unit is configured to ascertain that the AS has been authenticated successfully when the result of comparison by the first comparing unit shows consistency.

Preferably, the IMS user equipment further includes a third generating unit, a third transmitting unit, a third receiving unit, a fourth generating unit, a second comparing unit and a second ascertaining unit, where:

the third generating unit is configured to generate a second RAND;

the third transmitting unit is configured to transmit the second RAND generated by the third generating unit to the authentication gateway through the AS;

the third receiving unit is configured to receive a second RES transmitted through the AS from the authentication gateway;

the fourth generating unit is configured to generate a third RES from the second RAND generated by the third generating unit and authentication data of the IMS user equipment;

the second comparing unit is configured to compare the second RES received by the third receiving unit with the third RES generated by the fourth generating unit for consistency; and the second ascertaining unit is configured to ascertain that the AS has been authenticated successfully when the result of comparison by the second comparing unit shows consistency.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. An authentication system, comprising an Application Server, AS, providing a non-Internet Protocol Multimedia Subsystem, IMS, service, an authentication gateway and an IMS user equipment, wherein:

the AS is configured to forward a connection request message transmitted from the IMS user equipment to the authentication gateway and a first random number transmitted from the authentication gateway to the IMS user equipment, to transmit a first response value, generated from the first random number, fed back from the IMS user equipment to the authentication gateway and to provide the IMS user equipment with the non-IMS service in response to an instruction of the authentication gateway;

the authentication gateway is configured to acquire the first random number and an expected response value of the IMS user equipment, to transmit the acquired first random number to the AS, to ascertain that the IMS user equipment has been authenticated successfully when comparison of the first response value transmitted from the AS with the acquired expected response value shows consistency and to instruct the AS to provide the IMS user equipment with the non-IMS service; and the IMS user equipment is configured to transmit the connection request message to the AS, to generate the first response value from the first random number transmitted from the AS and to transmit the generated first response value to the AS.

2. The authentication system according to claim 1, wherein the authentication gateway acquires the first random number and the expected response value by acquiring authentication parameters of the IMS user equipment, which comprise the first random number and the expected response value of the IMS user equipment.

3. The authentication system according to claim 2, wherein the authentication parameters acquired by the authentication gateway further comprise a first Authentication Token, AUTN, and the authentication gateway is further configured to transmit the acquired first AUTN to the AS before receiving the first response value transmitted through the AS from the IMS user equipment;

the AS is further configured to transmit the first AUTN transmitted from the authentication gateway to the IMS user equipment;

the IMS user equipment is further configured to generate a second AUTN from the first random number before generating the first response value and to ascertain that the AS has been authenticated successfully when comparison of the generated second AUTN with the received first AUTN shows consistency.

4. The authentication system according to claim 1, wherein the first random number is generated by the authentication gateway, and the expected response value is generated by the authentication gateway from the generated first random number and acquired authentication data of the IMS user equipment after acquiring the authentication data.

5. The authentication system according to claim 4, wherein:

the IMS user equipment is further configured to generate a second random number, to transmit the generated second random number to the AS, to receive a second response value transmitted from the AS, to generate a third response value from the second random number and authentication data of the IMS user equipment and to ascertain that the AS has been authenticated successfully and access the non-IMS service provided by the AS when comparison of the received second response value with the generated third response value shows consistency;

the AS is further configured to transmit the second random number transmitted from the IMS user equipment to the authentication gateway and to transmit the second response value transmitted from the authentication gateway to the IMS user equipment; and the authentication gateway is further configured to receive the second random number transmitted from the AS, to generate the second response value from the received second random number and the acquired authentication data and to transmit the generated second response value to the AS.

6. An authentication method, comprising:

receiving, by an authentication gateway, a connection request message transmitted through an Application Server, AS, providing a non-Internet Protocol Multimedia Subsystem, IMS, service, from an IMS user equipment;

acquiring a first random number and an expected response value of the IMS user equipment;

transmitting, by the authenticating gateway, the acquired first random number to the IMS user equipment through the AS;

receiving a first response value transmitted through the AS from the IMS user equipment, wherein the first response value is generated by the IMS user equipment from the first random number;

ascertaining, by the authenticating gateway, that the IMS user equipment has been authenticated successfully when comparison of the received first response value with the acquired expected response value shows consistency; and instructing the AS to provide the IMS user equipment with the non-IMS service.

7. The authentication method according to claim 6, wherein acquiring by the authenticating gateway the first random number and the expected response value of the IMS user equipment comprises:

acquiring, by the authenticating gateway, authentication parameters of the IMS user equipment, which comprise the first random number and the expected response value of the IMS user equipment.

8. The authentication method according to claim 7, wherein the authentication parameters acquired by the authenticating gateway further comprise a first Authentication Token, AUTN; and
  transmitting, by the authentication gateway, the acquired first AUTN to the IMS user equipment through the AS before receiving the first response value transmitted through the AS from the IMS user equipment; and
  the method further comprises: before the IMS user equipment generates the first response value,
  generating, by the IMS user equipment, a second AUTN from the first random number; and
  ascertaining that the AS has been authenticated successfully when comparison of the generated second AUTN with the received first AUTN shows consistency.

9. The authentication method according to claim 7, further comprising: before the authentication gateway instructs the AS to provide the IMS user equipment with the non-IMS service,
  determining, respectively by the authentication gateway and the IMS user equipment, a shared key required for the IMS user equipment to subsequently access the non-IMS service;
  transmitting, by the authentication gateway, the determined shared key to the AS;
  receiving and storing, by the AS, the shared key; and
  authenticating, by the AS, the IMS user equipment by the shared key when the IMS user equipment subsequently accesses the non-IMS service.

10. The authentication method according to claim 9, further comprising: if the IMS user equipment accesses the non-IMS service through an internet explorer, after the AS receives and stores the shared key,
  encrypting, by the AS, a generated session identifier by the received shared key and transmitting the encrypted session identifier to the IMS user equipment;
  decrypting, by the IMS user equipment, the received encrypted session identifier by the determined shared key;
  starting the internet explorer according to the decrypted session identifier and an IMS public user identity, IMPU of the IMS user equipment and transmitting a connection request message carrying the IMPU and the decrypted session identifier to the AS in the internet explorer; and
  setting, by the AS, a cookie of the internet explorer started by the IMS user equipment according to the received IMPU and session identifier.

11. The authentication method according to claim 10, wherein the AS stores the generated session identifier in correspondence to the IMPU before transmitting the encrypted session identifier to the IMS user equipment; and
  the method further comprises: before the AS sets the cookie of the internet explorer started by the IMS user equipment,
  verifying, by the AS, the received IMPU and session identifier against stored correspondence relationships between session identifiers and IMPUs; and
  deleting the received IMPU and session identifier from the correspondence relationships between session identifiers and IMPUs upon successful verification.

12. The authentication method according to claim 6, wherein acquiring by the authentication gateway the first random number and the expected response value of the IMS user equipment comprises:
  generating, by the authentication gateway, the first random number;
  acquiring authentication data of the IMS user equipment; and
  generating the expected response value of the IMS user equipment from the generated first random number and the acquired authentication data.

13. The authentication method according to claim 12, further comprising:
  receiving, by the authentication gateway, a second random number transmitted through the AS from the IMS user equipment;
  generating a second response value from the received second random number and the acquired authentication data;
  transmitting the generated second response value to the IMS user equipment through the AS;
  generating, by the IMS user equipment, a third response value from the second random number and the authentication data of the IMS user equipment; and
  ascertaining that the AS has been authenticated successfully when comparison of the received second response value with the generated third response value shows consistency.

14. The authentication method according to claim 12, further comprising: if the IMS user equipment accesses the non-IMS service through an internet explorer,
  generating, by the authenticating gateway, a session identifier;
  encrypting the generated session identifier by the acquired authentication data and transmitting the encrypted session identifier to the IMS user equipment through the AS;
  decrypting, by the IMS user equipment, the received encrypted session identifier by the authentication data of the IMS user equipment;
  starting the internet explorer according to the decrypted session identifier and an IMPU of the IMS user equipment and transmitting a connection request message carrying the IMPU and the decrypted session identifier to the AS in the internet explorer; and
  setting, by the AS, a cookie of the internet explorer started by the IMS user equipment according to the received IMPU and session identifier.

15. The authentication method according to claim 12, further comprising: before the authentication gateway instructs the AS to provide the IMS user equipment with the non-IMS service,
  encrypting, by the IMS user equipment, the authentication data of the IMS user equipment by domain name information of the AS;
  transmitting the encrypted authentication data to the AS; and
  authenticating, by the AS, the IMS user equipment by the encrypted authentication data when the IMS user equipment subsequently accesses the non-IMS service.

16. The authentication gateway according to claim 1, comprising:
  a first receiving unit configured to receive a connection request message transmitted through an Application Server, AS, providing a non-Internet Protocol Multimedia Subsystem, IMS, service from an IMS user equipment;
  an acquiring unit configured to acquire a first random number and an expected response value of the IMS user equipment;
  a first transmitting unit configured to transmit the first random number acquired by the acquiring unit to the IMS user equipment through the AS;

a second receiving unit configured to receive a first response value transmitted through the AS from the IMS user equipment, wherein the first response value is generated by the IMS user equipment from the first random number;

a comparing unit configured to compare the first response value received by the second receiving unit with the expected response value acquired by the acquiring unit for consistency;

an ascertaining unit configured to ascertain that the IMS user equipment has been authenticated successfully when the result of comparison by the comparison unit shows consistency; and an instructing unit configured to instruct the AS to provide the IMS user equipment with the non-IMS service.

17. The authentication gateway according to claim 16, wherein the acquiring unit acquires authentication parameters of the IMS user equipment, comprising the first random number and the expected response value of the IMS user equipment.

18. The authentication gateway according to claim 17, wherein the authentication parameters acquired by the acquiring unit further comprise a first Authentication Token, AUTN; and the authentication gateway further comprises a second transmitting unit configured to transmit the first AUTN acquired by the acquiring unit to the IMS user equipment through the AS before the second receiving unit receives the first response value transmitted through the AS from the IMS user equipment.

19. The authentication gateway according to claim 17, wherein the authentication gateway further comprises:

a determining unit configured to determine a shared key required for the IMS user equipment to subsequently access the non-IMS service before the instructing unit instructs the AS to provide the IMS user equipment with the non-IMS service; and a third transmitting unit configured to transmit the shared key determined by the determining unit to the AS.

20. The authentication gateway according to claim 16, wherein the acquiring unit comprises:

a first generating sub-unit configured to generate the first random number;

an acquiring sub-unit configured to acquire authentication data of the IMS user equipment; and a second generating sub-unit configured to generate the expected response value of the IMS user equipment from the first random number generated by the first generating sub-unit and the authentication data acquired by the acquiring sub-unit.

21. The authentication gateway according to claim 20, further comprising:

a third receiving unit configured to receive a second random number transmitted through the AS from the IMS user equipment;

a generating unit configured to generate a second response value from the second random number received by the third receiving unit and the authentication data acquired by the acquiring sub-unit; and a fourth transmitting unit configured to transmit the second response value generated by the generating unit to the IMS user equipment through the AS.

22. The application server according to claim 1, providing a non-Internet Protocol Multimedia Subsystem, IMS, service and comprising:

a first receiving unit configured to receive a connection request message transmitted from an IMS user equipment;

a first forwarding unit configured to forward the connection request message received by the first receiving unit to an authentication gateway;

a second receiving unit configured to receive a first random number transmitted from the authentication gateway;

a second forwarding unit configured to forward the first random number received by the second receiving unit to the IMS user equipment;

a third receiving unit configured to receive a first response value transmitted from the IMS user equipment;

a third forwarding unit configured to forward the first response value received by the third receiving unit to the authentication gateway; and a providing unit configured to provide the IMS user equipment with the non-IMS service in response to an instruction of the authentication gateway.

23. The application server according to claim 22, further comprising:

a fourth receiving unit configured to receive an Authentication Token, AUTN, transmitted from the authentication gateway before the third receiving unit receives the first response value; and a fourth forwarding unit configured to forward the AUTN received by the fourth receiving unit to the IMS user equipment.

24. The application server according to claim 22, wherein the providing unit comprises:

a receiving sub-unit configured to receive the result of successful authentication transmitted from the authentication gateway;

a connection establishing sub-unit configured to establish a connection with the IMS user equipment after the receiving sub-unit receives the result of successful authentication; and a providing sub-unit configured to provide the IMS user equipment with the non-IMS service over the connection established by the connection establishing sub-unit.

25. The application server according to claim 22, further comprising:

a fifth receiving unit configured to receive and store a shared key transmitted from the authentication gateway before the providing unit provides the IMS user equipment with the non-IMS service; and if the IMS user equipment accesses the non-IMS service through an internet explorer, the application server further comprises:

a generating unit configured to generate a session identifier;

an encrypting unit configured to encrypt the session identifier generated by the generating unit by the shared key received by the fifth receiving unit;

a transmitting unit configured to transmit the session identifier encrypted by the encrypting unit to the IMS user equipment;

a sixth receiving unit configured to receive the connection request message, carrying an IMS public user identity, IMPU and the session identifier, transmitted from the IMS user equipment; and a setting unit configured to set a cookie of the internet explorer started by the IMS user equipment according to the IMPU and session identifier received by the sixth receiving unit.

26. The application server according to claim 25, further comprising:

a storing unit configured to store the session identifier generated by the generating unit in correspondence to the IMPU of the IMS user equipment before the transmitting unit transmits the session identifier encrypted by the encrypting unit to the IMS user equipment;

a verifying unit configured to verify the IMPU and the session identifier received by the sixth receiving unit against correspondence relationships between session identifiers and IMPUs in the storing unit before the setting unit sets the cookie of the internet explorer started by the IMS user equipment; and a deleting unit configured to delete the IMPU and the session identifier received by the sixth receiving unit from the correspondence relationships between session identifiers and IMPUs stored in the storing unit after the result of verification by the verifying unit shows successful verification.

27. The application server according to claim 22, further comprising:

a seventh receiving unit configured to receive a second random number transmitted from the IMS user equipment;

a fifth forwarding unit configured to forward the second random number received by the seventh receiving unit to the authentication gateway;

an eighth receiving unit configured to receive a second response value transmitted from the authentication gateway; and a sixth forwarding unit configured to forward the second response value received by the eighth receiving unit to the IMS user equipment.

28. The IMS user equipment according to claim 1, comprising:

a first transmitting unit configured to transmit a connection request message to an Application Server, AS, providing a non-Internet Protocol Multimedia Subsystem, IMS, service;

a first receiving unit configured to receive a first random number transmitted through the AS from an authentication gateway;

a first generating unit configured to generate a first response value from the first random number received by the first receiving unit;

a second transmitting unit configured to transmit the first response value generated by the first generating unit to the AS; and a service accessing unit configured to access the non-IMS service from the AS.

29. The Internet Protocol Multimedia Subsystem user equipment according to claim 28, further comprising:

a second receiving unit configured to receive a first Authentication Token, AUTN, transmitted through the AS from the authentication gateway before the first generating unit generates the first response value;

a second generating unit configured to generate a second AUTN from the first random number received by the first receiving unit;

a first comparing unit configured to compare the second AUTN generated by the second generating unit with the first AUTN received by the second receiving unit for consistency; and a first ascertaining unit configured to ascertain that the AS has been authenticated successfully when the result of comparison by the first comparing unit shows consistency.

30. The Internet Protocol Multimedia Subsystem user equipment according to claim 28, further comprising:

a third generating unit configured to generate a second random number;

a third transmitting unit configured to transmit the second random number generated by the third generating unit to the authentication gateway through the AS;

a third receiving unit configured to receive a second response value transmitted through the AS from the authentication gateway;

a fourth generating unit configured to generate a third response value from the second random number generated by the third generating unit and authentication data of the user equipment;

a second comparing unit configured to compare the second response value received by the third receiving unit with the third response value generated by the fourth generating unit for consistency; and a second ascertaining unit configured to ascertain that the AS has been authenticated successfully when the result of comparison by the second comparing unit shows consistency.

* * * * *